US009558257B2

(12) United States Patent
Takeuchi et al.

(10) Patent No.: US 9,558,257 B2
(45) Date of Patent: *Jan. 31, 2017

(54) METHOD OF SYNCHRONIZING DATA BETWEEN DATABASES, AND COMPUTER SYSTEM AND COMPUTER PROGRAM FOR THE SAME

(71) Applicant: International Business Machines Corporation, Armonk, NY (US)

(72) Inventors: Mikio Takeuchi, Kanagawa-ken (JP); Gaku Yamamoto, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 59 days.

This patent is subject to a terminal disclaimer.

(21) Appl. No.: 14/256,982

(22) Filed: Apr. 20, 2014

(65) Prior Publication Data

US 2014/0229437 A1      Aug. 14, 2014

Related U.S. Application Data

(63) Continuation of application No. 12/750,059, filed on Mar. 30, 2010, now Pat. No. 8,751,445.

(30) Foreign Application Priority Data

Apr. 28, 2009   (JP) .................................. 2009-110017

(51) Int. Cl.
G06F 17/30    (2006.01)
(52) U.S. Cl.
CPC .............................. *G06F 17/30581* (2013.01)

(58) Field of Classification Search
CPC .................................................. G06F 17/30581
See application file for complete search history.

(56) References Cited

U.S. PATENT DOCUMENTS 7,290,018 B2    10/2007   Muecklich et al.
8,751,445 B2    6/2014    Takeuchi et al.
2006/0112150 A1  5/2006   Brown et al.
2007/0239797 A1* 10/2007  Cattell .............. G06F 17/30306
(Continued)

FOREIGN PATENT DOCUMENTS

JP       7334402 A      12/1995
JP       9062557 A      3/1997

OTHER PUBLICATIONS

Advisory Action from U.S. Appl. No. 12/750,059, dated Oct. 12, 2012.
(Continued)

*Primary Examiner* — Huawen A Peng
(74) *Attorney, Agent, or Firm* — Kali Law Group, P.C.

(57) ABSTRACT

Systems for synchronizing data between a first-database and a second-database are presented including: a memory; and a client configured for determining whether a retrieval request requires a synchronization of the second-database before processing the received retrieval request, where the system partially synchronizes the second-database from the first-database with only that portion of the first-database associated with the retrieval request in response to determining whether synchronization is required and for processing the retrieval request from the second-database.

19 Claims, 16 Drawing Sheets

(56) References Cited

U.S. PATENT DOCUMENTS

| | | | |
|---|---|---|---|
| 2010/0114831 A1* | 5/2010 | Gilbert | G06F 17/30575 707/648 |
| 2010/0153423 A1* | 6/2010 | Lu | G06F 17/3038 707/759 |
| 2010/0161551 A1* | 6/2010 | Whynot | G06F 11/2094 707/610 |
| 2010/0205323 A1* | 8/2010 | Barsness | G06F 17/30477 709/248 |
| 2010/0274759 A1 | 10/2010 | Takeuchi et al. | |

OTHER PUBLICATIONS

Final Office Action from U.S. Appl. No. 12/750,059, dated Jul. 31, 2012.
Non-Final Office Action from U.S. Appl. No. 12/750,059, dated Feb. 21, 2012.
Notice of Allowance from U.S. Appl. No. 12/750,059, dated Jan. 27, 2014.
Takeuchi, U.S. Appl. No. 12/750,059, filed Mar. 30, 2010.

* cited by examiner

411

| | RETRIEVAL REQUEST THAT REQUIRES CURRENCY | THRESHOLD | PASS-THROUGH |
|---|---|---|---|
| a1 | RETRIEVAL REQUEST FOR RETRIEVING COLUMN WITH COLUMN ITEM A1 | ONE HOUR | X |
| a2 | RETRIEVAL REQUEST FOR RETRIEVING COLUMN WITH COLUMN ITEM A3 | 30 MINUTES | O |
| a3 | RETRIEVAL REQUEST FOR RETRIEVING TABLE b | 6 MINUTES | X |

412

| | RETRIEVAL REQUEST | EXPECTED RETRIEVAL REQUEST | EXPECTED ISSUE TIME |
|---|---|---|---|
| a4 | RETRIEVAL REQUEST FOR RETRIEVING COLUMN WITH COLUMN ITEM A4 | RETRIEVAL REQUEST FOR RETRIEVING TABLE b | IN 10 MINUTES |

FIG. 4B

METHOD OF SYNCHRONIZING DATA BETWEEN DATABASES, AND COMPUTER SYSTEM AND COMPUTER PROGRAM FOR THE SAME

FIELD OF THE INVENTION

The present invention relates to a method of synchronizing data between a first database and one or more second databases, each storing at least one piece of data included in the first database, and a computer system and computer program for the same.

BACKGROUND

In order to improve the performance of a system including databases, there is a method using multiple in-memory and back-end databases. The in-memory database is also called in-core database or main memory database. The in-memory database is to store data in a semiconductor memory instead of a hard disk drive. The back-end database is a main database that includes data as the source of the in-memory database. The in-memory database holds all or part of data of the back-end database, and is used as a cache for the back-end database. The in-memory database processes database I/O on the semiconductor memory without reading from or writing to the hard disk drive. Therefore, in the in-memory database, data read or written by an application is held in a cache on the memory by means of the in-memory database, accessing the database of the hard disk drive by a process totally independent of the application. From the standpoint of the application, SQL is issued to the in-memory database in a way without any difference from the database on the hard disk drive. Then, a query request from the application is processed by the in-memory database. Using the in-memory database, a data set is retrieved from the in-memory database. This results in reducing the load on the back-end database and improving the processing speed as the database dramatically.

Data in the back-end database is updated. Therefore, the in-memory database needs to reflect the update therein. The in-memory database has to load data from the back-end database to perform the update. Typical conventional methods for achieving the reflection include a periodic synchronization method and a real-time synchronization method.

Periodic Synchronization Method

The periodic synchronization method is a method of applying a data set of the back-end database to the in-memory database collectively on a periodic basis to update the data set of the in-memory database. This update provides synchronization between the back-end database and the in-memory database. In general, processing data collectively in a large batch imposes less load on the database than processing data in small batches. Therefore, the periodic synchronization method enables replication from the back-end database to the in-memory database while reducing the load on the back-end database. However, the data set of the in-memory database is a data set at the time of periodic synchronization, not the latest data set. Thus, the periodic synchronization method has a problem that the database users cannot issue, to the in-memory database, such a search or retrieval request that requires the latestness or currency of data.

As a retrieval technique to solve the above-mentioned problem of the periodic synchronization method, there is pass-through retrieval. The pass-through retrieval is a retrieval technique that has already been put to practical use as one of in-memory database techniques. The method using the pass-through retrieval is executed concurrently with the above-mentioned periodic synchronization method. In the pass-through retrieval, if such a retrieval request that requires data currency is issued to the in-memory database, this retrieval request is transmitted to the back-end database. Therefore, the system searches the back-end database. However, if the search criteria are complicated, since the load on the back-end database increases, the performance of the entire system will be reduced.

2. Real-Time Synchronization Method

The real-time synchronization method is a method in which the system transmits, in response to an update of the back-end database, the updated data set of the back-end database to the in-memory database to update the data set of the in-memory database promptly. This update provides real-time synchronization between the back-end database and the in-memory database, thus resolving the above-mentioned problem of the periodic synchronization method. However, in the real-time synchronization method, if the frequency of updates to the back-end database is high, the system will perform replication from the back-end database to the in-memory database frequently in small batches. Such frequent replication attempts increase the load on the back-end database, resulting in a further reduction in the performance of the entire system. In addition, the above-mentioned replication is performed regardless of whether the currency of data to be retrieved from the in-memory database is required. However, when many of retrieval requests to be issued to the in-memory database do not require data currency, it is less likely that the updated, latest data set will be required. Therefore, the replication could be useless processing that merely reduces the performance of the entire system.

SUMMARY

Systems for synchronizing data between a first-database and a second-database are presented including: a memory; and a client configured for determining whether a retrieval request requires a synchronization of the second-database before processing the received retrieval request, where the system partially synchronizes the second-database from the first-database with only that portion of the first-database associated with the retrieval request in response to determining whether synchronization is required and for processing the retrieval request from the second-database. In some embodiments, systems further include: an application for receiving the retrieval request from a user; a driver for providing the application an application programming interface (API) for operating the databases; an asynchronous replication transmitter for transmitting that portion of the first-database associated with the retrieval request; an asynchronous replication receiver for receiving that portion of the first-database associated with the retrieval request; and an update log table for storing update information for the first-database, where the update information includes at least updated data and updated time. In some embodiments, systems further include: a structured query language (SQL) statement determiner for determining whether the retrieval request requires currency; a second-database retrieval caller for processing the retrieval request from the second-database when the retrieval request does not require currency; and a first-database synchronization determiner coupled with a client-side synchronization time recorder for determining whether synchronization between the first-database and the second-database is required. In some embodiments, systems further include: a second-database synchronization determiner coupled with a system synchronizing time recorder for determining whether synchronization between the first-database and the second-database is required. In some embodiments, systems further include: an anticipated synchronization processor coupled with an anticipated synchronization request recorder and the system synchronizing time recorder for determining whether to request synchronization processing for each target table in the second-database associated with the retrieval request.

In some embodiments, the retrieval request includes at least one data set included in the database to be referenced and where the retrieval request further includes at least a SELECT phrase of an SQL statement, a pass-through request, or a command using a reserved word prepared for the databases. In some embodiments, the client-side synchronization time recorder includes a synchronization time concerting the target table. In some embodiments, the system synchronizing time recorder includes a an update time of the target table. In some embodiments, the client further includes an SQL statement definition file, where the SQL statement definition file includes at least: a declaration of SQL statement that requires data currency, a table name, and a threshold value as a target of a synchronization processing performed according to the respective SQL statements.

In other embodiments, systems for synchronizing data between a first-database and a second-database in response to a retrieval request are presented including: a memory; an application for receiving the retrieval request from a user; a driver for providing the application an application programming interface (API) for operating the databases; a client configured for determining whether a retrieval request requires a synchronization of the second-database before processing the received retrieval request, where the system partially synchronizes the second-database from the first-database with only that portion of the first-database associated with the retrieval request in response to determining synchronization is required and for processing the retrieval request from the second-database, where that portion represents only a portion of data out of all possible data sets that differ between the first-database and the second-database; an asynchronous replication transmitter for transmitting that portion of the first-database associated with the retrieval request; an asynchronous replication receiver for receiving that portion of the first-database associated with the retrieval request; and an update log table for storing update information for the first-database, where the update information includes at least updated data and updated time. In some embodiments, the client further includes: a structured query language (SQL) statement determiner for determining whether the retrieval request requires currency, where currency is determinative of whether the retrieval request requires up-to-date data; a second-database retrieval caller for processing the retrieval request from the second-database when the retrieval request does not require currency; and a first-database synchronization determiner coupled with a client-side synchronization time recorder for determining whether synchronization between the first-database and the second-database is required. In some embodiments, systems further include: a second-database synchronizer coupled with a system synchronizing time recorder for determining whether synchronization between the first-database and the second-database is required. In some embodiments, systems further include: an anticipated synchronization processor coupled with an anticipated synchronization request recorder and the system synchronizing time recorder for determining whether to request synchronization processing for each target table in the second-database associated with the retrieval request.

BRIEF DESCRIPTION OF THE SEVERAL VIEWS OF THE DRAWINGS

FIG. 4B shows a specific example of lists used for the operation of each step shown in FIG. 2 to FIG. 2C in the embodiment of the present invention.

DETAILED DESCRIPTION

Figure 1A:
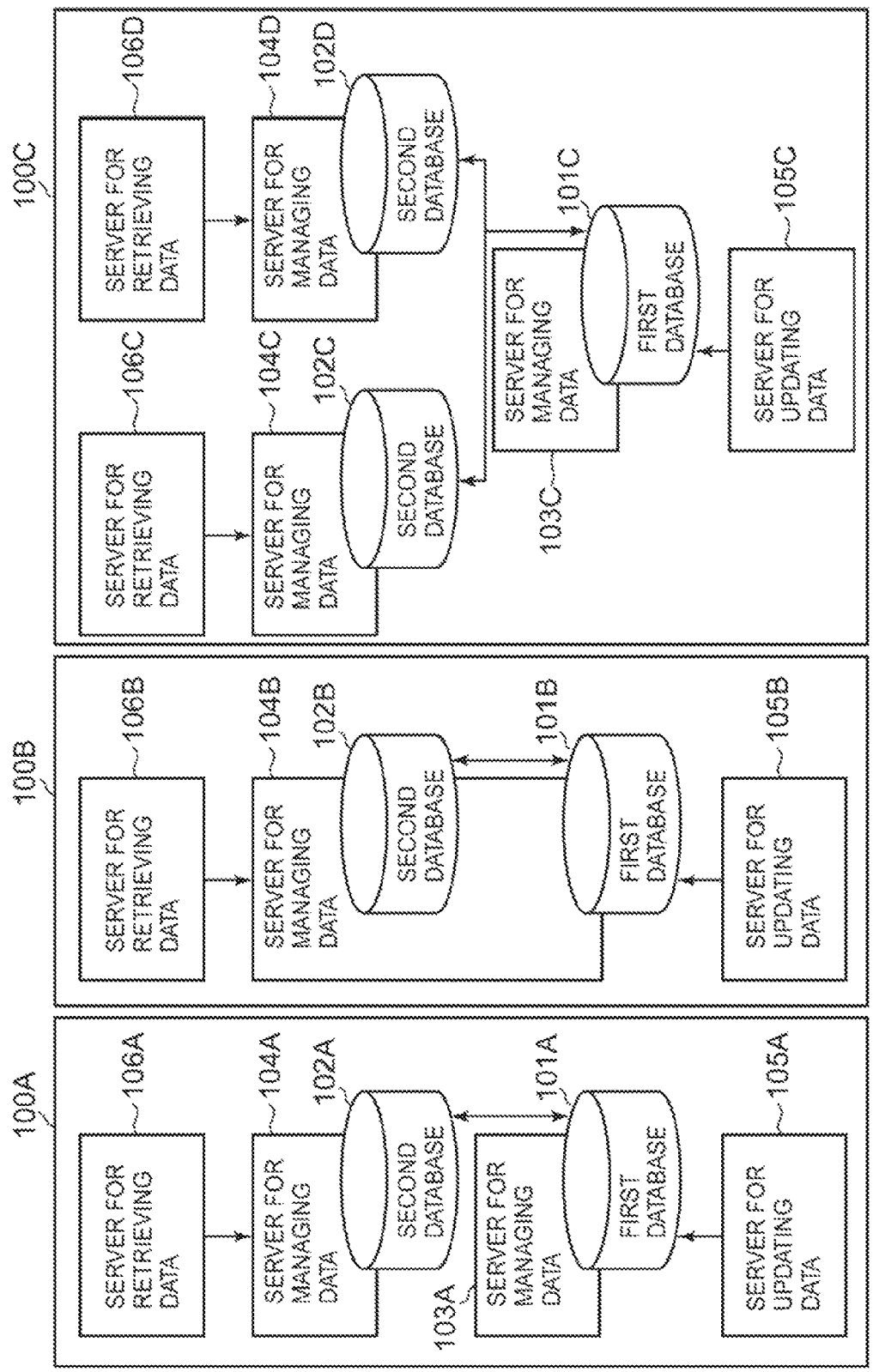
FIG. 1A is a block diagram showing examples of system configurations in a computer system according to a preferred embodiment of the present invention.

In a preferred embodiment of the present invention, "first database" means a master database of the system. The first database can operate as a back-end database, for example. In the first database, data used in the system are managed in an up-to-date state. A data set included in the first database is replicated to a second database. The first database is, for example, a database managed by a database management system (DBMS) or a collection of data created by a file system provided by an OS, but is not limited thereto. The database management system can be selected, for example, from IBM® DB2® Oracle® database, Microsoft® SQL Server®, PostgreSQL, MySQL®, or SQLite.

In the embodiment of the present invention, "second database" means a sub-database of the system, which is paired with the master database of the system. The second database can operate as a front-end database. The second database is a database holding at least one piece of data included in the first database. The second database can receive a retrieval request to be described later. The second database can be selected, for example, from a cache database, an in-memory database, a database managed by a database management system, or a collection of data created by a file system provided by an OS, but not be limited thereto.

In one aspect of the present invention, the second database is a cache database with a back-end database set as the first database. The cache database is a database stored in a cache area accessible faster than the access to the back-end database. When the back-end database is stored in a hard disk drive, for example, the cache area may be in a semiconductor memory. When the back-end database is stored in a hard disk drive connected through LAN, for example, the cache area may be a hard disk drive connected through a bus faster than the LAN, e.g., with a higher speed of rotation (10000 rpm or more), or a hard disk drive having a large cache memory capacity. The cache database holds all or part of data of the back-end database.

In another aspect of the present invention, the second database is an in-memory database with a back-end database set as the first database. The in-memory database is a database storing data in a semiconductor memory, not in a hard disk drive, and paired with the back-end database. The in-memory database holds all or part of data of the back-end database.

In the embodiment of the present invention, "synchronizing data" means that at least one piece of data on different databases is set to such a value to return the same result, respectively, when referenced. For example, setting respective data to the same value corresponds to synchronizing the data. The timing of setting such a value to return the same result is not necessarily simultaneous between the first database and the second database. For example, the timing is when the data is referenced by the user, when the data is expected to be referenced by the user, or it reaches time specified by the user, but is not limited thereto.

In the embodiment of the present invention, "retrieval request" means a request including that at least one data set included in the database is to be referenced, but not including that the data set as a synchronization target is to be updated. This request is, for example, a request using the SELECT phrase of an SQL statement, a pass-through request to be described later, or a command using a reserved word prepared for the database, but is not limited thereto.

In the embodiment of the present invention, "future retrieval request" means a retrieval request which has the possibility of being issued after the above-mentioned retrieval request. This possibility may occur with any action caused in the system. For example, any action means that another retrieval request is issued, an application is started, or a given time has come, but is not limited thereto.

In the embodiment of the present invention, "data set" means a collection of data. The data set may include, but not be limited to, certain data, a group to which the data belong, data associated with the certain data, other groups associated with the certain data respectively, or a combination thereof. The group is a table, a column, or a row, but is not limited thereto. The term "associated" means "linked" or "referenced," but is not limited thereto.

In the embodiment of the present invention "differential data" means data included in at least one common or associated data set between different databases, i.e., the data have values different between the databases, or data partially including different data. The term "associated" means, for example, a relationship between replication source and replication destination, but it is not limited thereto.

In the embodiment of the present invention, "retrieval request requires data currency" means that data to be retrieved according to the retrieval request must be data before the elapse of a certain time indicated by a given threshold value, to be described later, after replication is performed.

In the embodiment of the present invention, "expected issue time" means the time at which the above-mentioned future retrieval request is expected to be issued. The expected issue time is, for example, a relative time from a certain action taken at a system time or in the system. The certain action means, for example, that a retrieval request is issued, an application is started, or a given time has come, but is not limited thereto. The expected issue time may be set by the user or determined statistically, for example. When it is determined statistically, the computer system may record an interval from the issue of a retrieval request to the issue of another retrieval request each time to set the average value of the recorded times as the expected issue time.

In the embodiment of the present invention, "given threshold value" means such a value to indicate a time range representing how new the data is enough to be retrieved according to a retrieval request that requires data currency. For example, the given threshold value is represented by a relative time, which goes back to the past from the issue of the retrieval request.

In the embodiment of the present invention, a "declaration included in a retrieval request" means a command indicative of a retrieval request used for retrieval of data from a database. The command includes, but is not limited to, an SQL SELECT statement, for example. The declaration included in the retrieval request is a prepared statement, for example. In the declaration, a specific data value, a stored location, or a conditional expression used to narrow down the data may be masked or not be masked. For example, suppose that the command indicative of a retrieval request is "select data1,data2 from table1 where data1=10." In this case, masking may be either of a), b), or c) to be cited below. Note that masking is expressed by "?" in the following a), b), and c).

Example of Masking a Value of Specific Data

"select ? from table1 where data1=10"

b) Example of Masking a Stored Location

"select data1,data2 from ? where data 1=10"

c) Example of Masking a Conditional Expression Used to Narrow Down Data

"select data1, data2 from table1 ?"

In the embodiment of the present invention, "pass-through" means that a request issued to the second database is transferred to the first database. This transfer enables a response to the request to be obtained from the first database instead of the second database.

Many applications have both retrieval processing that requires data currency (hereinafter referred to as "first retrieval processing") and retrieval processing that does not require data currency (hereinafter referred to as "second retrieval processing"). For example, in a typical application for an e-commerce site, the first retrieval processing is retrieval processing for information on inventory of commercial products, and the second retrieval processing is retrieval processing for products. Here, products are retrieved and listed in a list of products on the e-commerce site, for example. However, on a product list page, product inventory information is rarely retrieved and listed. Users of the e-commerce site are navigated from the product list page to track detailed product information. The product inventory information can first be retrieved and displayed at a predetermined stage.

Further, for example, in an application for a hotel search site, the first retrieval processing is retrieval processing for data on room availability, and the second retrieval processing is retrieval processing for hotels or areas, for example. Here, data acquired by the retrieval processing for data on room availability need to be as up-to-date as possible, but does not need to be data at the present moment. For example, the data on room availability may be allowed even if it is old data on rooms that were available about a few minutes ago. In the application for the hotel search site, processing that requires real-time data currency is only processing for hotel reservations. Here, a case is assumed where the application for the hotel search site provides the following two kinds of retrieval functions:

Navigational retrieval function which, when a user specifies any one of prefectures in Japan, shows areas within the prefecture, and when the user further specifies an area, which shows hotels in the area.

Search function which, when the user specifies an area to stay and arrival date, shows hotels having rooms available near the area on the arrival date The application for the hotel search site is created on the assumption that many users will use the above search function 1. The application for the hotel search site is also created on the assumption that users who are staying at hotels with specific purposes search for hotels using the above search function 2.

When a hotel is searched for using the above search function 1, the above navigation progresses, and only at the stage of search for room availability information, the data on room availability can be retrieved and displayed. When a hotel is searched for using the above search function 2, the data on room availability can be retrieved and displayed as a result of the above search 2.

As shown in the example of the e-commerce site and the example of the hotel search site, there are not so many cases where real-time, up-to-date data is required in the application. Therefore, in one aspect of the present invention, the system synchronizes a data set retrieved from the back-end database with a data set retrieved from the in-memory database according to how much currency is necessary for the data.

The embodiment of the present invention will now be described with reference to the accompanying drawings. It should be understood that the embodiment is to describe a preferred form of the present invention and is not in any way intended to restrict the scope of the invention. Throughout the figures to be cited below, the same reference numerals are used to denote the same objects unless otherwise indicated.

FIG. 1A is a block diagram showing examples of system configurations (100A to 100C) in a computer system according to the embodiment of the present invention. Each of the system configurations (100A to 100C) includes a first database (101A to 101C, respectively), a second database(s) (102A to 102D, respectively), a server(s) for managing data of the databases (103A, 103C and 104A to 104D, respectively), a server for updating data (105A to 105C, respectively), and a server(s) for retrieving data (106A to 106D, respectively). The first database (101A to 101C, respectively) is a database storing data on the entire computer system. Data included in the first database (101A to 101C, respectively) can be updated by the server (105A to 105C, respectively) for updating data. The second database (102A to 102D, respectively) is a database replicated from the first database (101A to 101C, respectively). The second database (102A to 102D, respectively) includes part or all of data extracted from the first database (101A to 101C, respectively). Data included in the second database (102A to 102D, respectively) can be retrieved by the server (106A to 106D, respectively) for retrieving data. The server (103A, 103C, and 104A to 104D, respectively) for managing data manages data of the databases. On the server(s) (103A, 103C, and 104A to 104C, respectively) for managing data, a database management system (DBMS) is installed, for example. The server(s) (103A, 103C, and 104A to 104C, respectively) for managing data manages data included in the first database (101A to 101C, respectively), or the second database (102A to 102D, respectively), or both the databases (101A to 101C and 102A to 102D, respectively) by means of the database management system (DBMS). Here, it is not always true that the first database (101A to 101C, respectively) and the second database (102A to 102D, respectively) are located on the server (103A, 103C, and 104A to 104D, respectively) for managing data. The first database (101A to 101C, respectively) and the second database (102A to 102D, respectively) may be included on any other server inside or outside of the system. The server (105A to 105C, respectively) for updating data receives an update request from a client or otherwise creates an update request by itself. The server (105A to 105C, respectively) for updating data issues the update request to the first database (101A to 101C, respectively) to update data included in the first database (101A to 101C, respectively). The server (105A to 105C, respectively) for updating data may be or not be included in the system. The server (106A to 106D, respectively) for retrieving data receives a retrieval request from a client or otherwise creates a retrieval request by itself. The server (106A to 106D, respectively) for retrieving data issues the retrieval request to the second database (102A to 102D, respectively) to retrieve data included in the second database (102A to 102D, respectively). The server (106A to 106D, respectively) for retrieving data may be or not be included in the system.

The system configuration (100A) is an example of a system configuration in which the first database (101A) and the second database (102A) are managed by different servers (103A and 104A), respectively. In the system configuration (100A), the servers (103A and 104A) for managing data communicate with each other to perform replication between the first database (101A) and the second database (102A). The system configuration (100B) is an example of a system configuration in which the first database (101B) and the second database (102B) are managed by the common server (104B). In the system configuration (100B), replication between the first database (101B) and the second database (102B) is performed without the above communication. The system configuration (100C) is configured such that the two or more second databases (102C and 102D) are included on the server (104C and 104D), respectively. The system configuration (100C) is an example of a system configuration in which the second databases (102C and 102D) are managed by two or more server (104C and 104D). In the system configuration (100C), the server (103C) for managing data communicates with the servers (104C and 104D), respectively, to perform replication between the databases. Data respectively included in the second databases (102C and 102D) are managed by the servers (104C and 104D) for managing data individually. Therefore, the data respectively included in the second databases (102C and 102D) may be different data or the same data.

The system configuration in the computer system according to the embodiment of the present invention is not limited to the above system configurations (100A to 100C). In the system configurations (100A to 100C), each database and each server (105A to 105C) for updating data or each server (106A to 106D) for retrieving data have a one-to-one correspondence. However, the relationship between each database and each server (105A to 105C) for updating data or each server (106A to 106D) for retrieving data is not always one-to-one correspondent. For example, in the system configuration (100C), the server (106C) for retrieving data may issue a retrieval request to both the second databases (102C and 102D). Further, the server (105C) for updating data and the server (106C) for retrieving data may be the same server, for example. In the case of the same server, the server can issue both the retrieval request to the second databases (102C and 102D) and the update request to the first database (101C). In addition, the computer system may be a computer system provided with two or more system configurations shown in FIG. 1A.

Figure 1B:
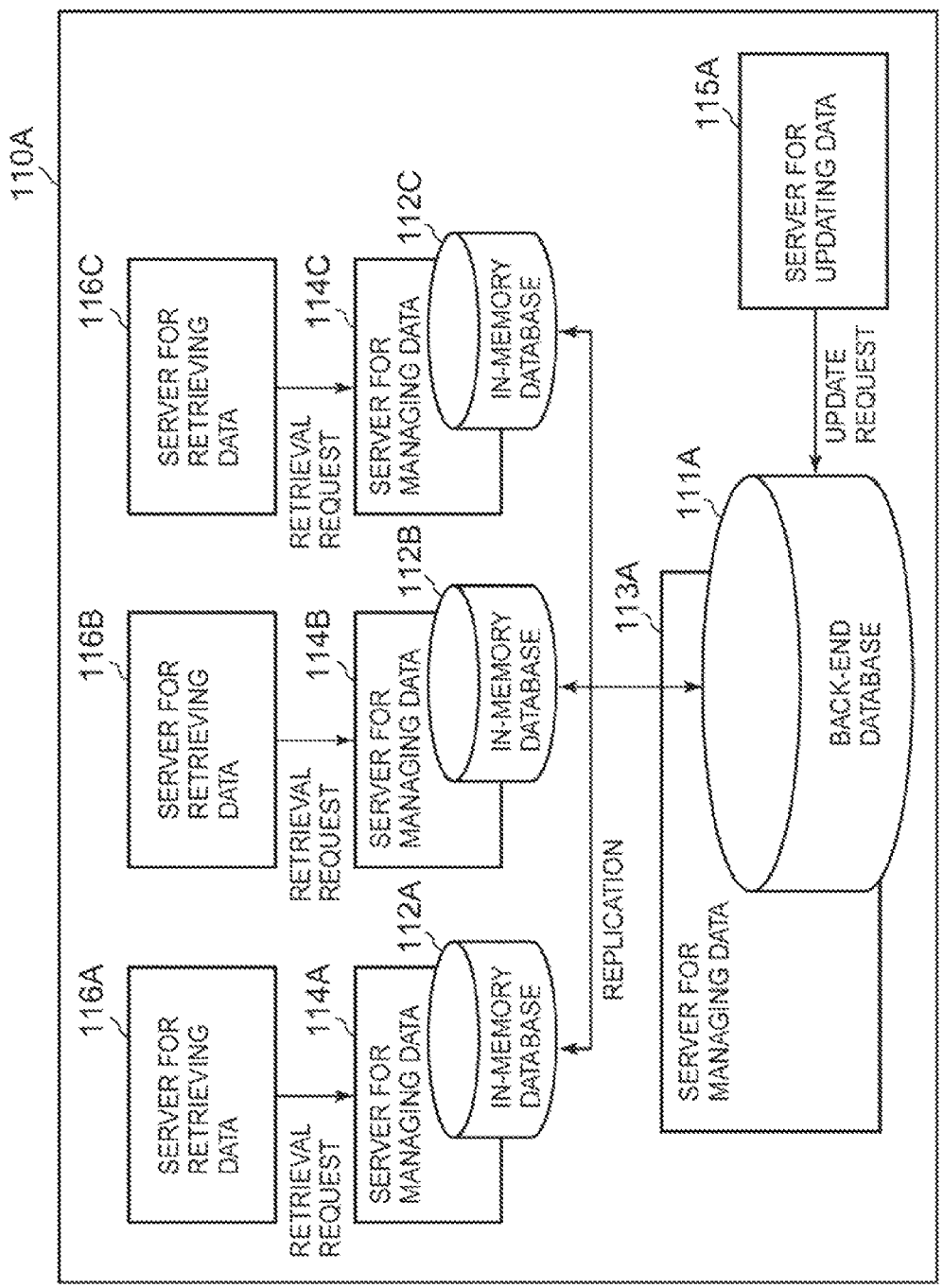
FIG. 1B is a block diagram showing still another example of system configuration other than those shown in FIG. 1A in such a case that a first database is a back-end database and a second database is in-memory databases in the embodiment of the present invention.

FIG. 1B is a block diagram showing still another example of system configuration other than those shown in FIG. 1A in such a case that the first database is a back-end database and the second databases are in-memory databases. A back-end database (111A) is a database storing data on the entire computer system. The back-end database (111A) corresponds to the first database. Data included in the back-end database (111A) can be updated by a server (115A) for updating data. In-memory databases (112A to 112C) are replicated from the back-end database (111A). The in-memory databases (112A to 112C) correspond to the second databases, respectively. Each of the in-memory databases (112A to 112C) includes part or all of data extracted from the back-end database (111A). Data included in the in-memory databases (112A to 112C) can be retrieved by servers (114A to 114C) for retrieving data, respectively.

A system configuration (110A) includes at least one in-memory database (112A to 112C) and one back-end database (111A). Two or more in-memory databases (112A to 112C) may be provided, for example, for respective types of data, respective data processing, or respective data accessing times. The type of data may include data on customers, data on products, and data on price. The data processing may be a withdrawal or deposit transaction, for example. The data accessing time may be a weekday daytime, a weekday nighttime, or Saturday and Sunday, for example. The in-memory databases (112A to 112C) can be distributed to one or more systems.

Replication may be performed at certain time intervals or at a time specified by a user. The time interval can be defined by the user. The time interval may be ten minutes, one hour, or one day, but not be limited thereto. Suppose that the server (115A) for updating data updates data frequently during daytime hours but rarely during nighttime hours. In such a case, the user can define the time interval as 30 minutes for daytime and five hours for nighttime, for example. Further, replication may be performed depending on the load placed on each database. The computer system may have a database management system monitor the load, for example. The computer system may perform replication when the load falls below a threshold value defined by the user, for example. Upon replication, the computer system collectively reads differential data from the back-end database (111A). The collectively read differential data includes, for example, a data set updated after the previous replication. The computer system transfers the read data to the in-memory databases (112A to 112C). Then, the computer system applies the transferred data to the in-memory databases (112A to 112C). In a typical database, processing for acquiring and updating many records in a stroke is faster than processing for acquiring and updating the many records in multiple transactions. When replication is performed in units of collectively read data sets, the loads placed on the back-end database (111A) and the in-memory databases (112A to 112C) can be reduced.

Replication can also be performed when a retrieval request has been issued. The details of replication performed when a retrieval request has been issued will be described later with reference to FIG. 2A to FIG. 2C.

In the system configuration (110A), the in-memory databases (112A to 112C) can be in a cluster. Thus, upon replication, the computer system acquires, from the back-end database (111A), differential data on each of the multiple in-memory databases (112A to 112C). Here, differential data acquired for an in-memory database can include differential data that is not acquired for the other in-memory databases. Thus, differential data is not always deleted from the back-end database (111A) just because the differential data has been acquired from the back-end database (111A). Therefore, it is preferred to perform replication in such a manner not to reacquire as much data already replicated as possible. However, even if duplicated differential data have been acquired, the data are just rewritten, for example, and this does not cause inconsistency between data included in the back-end database (111A) and data included in each of the in-memory databases (112A to 112C).

The following description with reference to FIG. 2 to FIG. 5 takes an example in which the database corresponding to the first database is a back-end database and the database corresponding to the second database is an in-memory database.

Figure 2A:
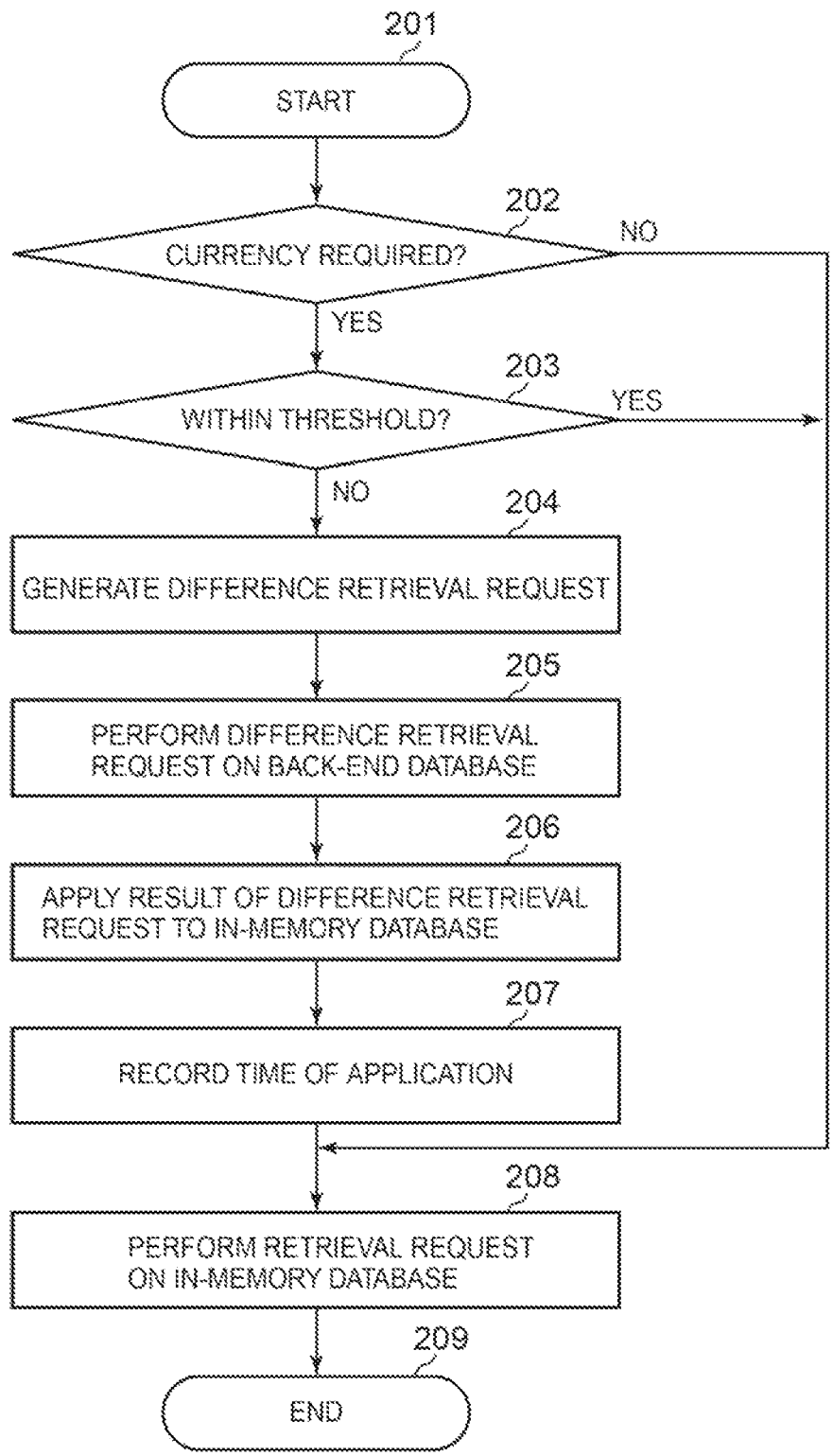
FIG. 2A is a flowchart showing processing steps upon data retrieval performed in the system shown in FIG. 1B in the embodiment of the present invention.

FIG. 2A shows an example of processing steps upon data retrieval performed in the system shown in FIG. 1B in the embodiment of the present invention. The computer system executes the following steps 201 to 209 in response to issuing a retrieval request to the in-memory database. This processing starts at step 201.

In step 202, the computer system determines whether the issued retrieval request (current retrieval request) or a retrieval request (future retrieval request) that can be issued after the issued retrieval request is a retrieval request that requires currency. In this determination, the computer system determines whether a declaration included in the current retrieval request or the future retrieval request is listed in a list (hereinafter referred to as "first list") of declarations of retrieval requests that require currency. The first list is a list created by the user beforehand. In the first list, combinations of declarations, included in retrieval requests that require currency, and threshold values are listed, respectively. The future retrieval request is retrieved from a list (hereinafter referred to as "second list") in which combinations of declarations of current retrieval requests and declarations of future retrieval requests corresponding to respective current retrieval requests and requiring currency are listed. The second list is a list created by the user beforehand. In the second list, combinations of declarations included in current retrieval requests and declarations included in future retrieval requests, which correspond to respective current retrieval requests and require currency, are listed, respectively. The second list may be included in the first list. If the declaration of the current retrieval request or the future retrieval request is included in the first list, this processing proceeds to step 203. On the other hand, if the declaration is not included, this processing proceeds to step 208.

In step 203, the computer system determines whether the time of past application, to the in-memory database, of the data set as the retrieval target of the current retrieval request or the future retrieval request (hereinafter referred to as "past application time") is within a currency threshold value. The currency threshold value means a time range in which the data set is accepted even if it is old. If the threshold value is one hour, any data set applied to the in-memory database within one hour is considered to be within the threshold value. The past application time means the time of recording the data set in a log or the like in step 207 to be described later in response to a previous issue of the current retrieval request or the future retrieval request. The computer system calculates a difference between an expected issue time of the current retrieval request or the future retrieval request and the past application time. If the calculated difference is within a threshold value corresponding to the declaration of the current retrieval request or the future retrieval request listed in the first list, this processing proceeds to step 208. On the other hand, if the difference is beyond the threshold value, this processing proceeds to step 204.

In step 204, the computer system generates a difference retrieval request. The difference retrieval request is a request for retrieving, from the back-end database, differential data between a data set applied to the in-memory database and a data set at the time of issue of the current retrieval request. For example, the difference retrieval request is to retrieve a table, column, or record to which the retrieval target of the current retrieval request or the future retrieval request belongs, but is not limited thereto. Further, the table, column, or record may be one or more. For example, suppose that the table to which the retrieval target belongs includes a table including column items "Employee No. (key item)," "Family Name (Kanji)," "Given Name (Kanji)," "Family Name (Kana)," and "Given Name (Kana)" and a table including column items "Employee No. (key item)" and "Length of Service." Suppose further that the retrieval target includes column items "Family Name (Kanji)" and "Length of Service." Here, for example, if the column with the column item "Given Name (Kanji)" is a column retrievable in other retrieval processing and the columns with the column items "Family Name (Kana)" and "Given Name (Kana)" are columns not to be retrieved, the computer system can generate a difference retrieval request for retrieving the columns with the column items "Family Name (Kanji)," "Given Name (Kanji)," and "Length of Service." Further, for example, if the retrieval target is a record in which the employee No. is in the thousands, the difference retrieval request may be a request for retrieving records from No. 1000 to No. 1999 or a request for retrieving all records. Further, if a command for performing replication is prepared in a database management system used, the command may be used as the difference retrieval request. Further, for example, the difference retrieval request may be a request for retrieving a table, column, or record associated with the retrieval target of the current retrieval request or the future retrieval request. The term "associated" means a reference relationship with an external key, for example. The user can create beforehand a correspondence table showing a relationship between the current retrieval request or the future retrieval request and the table, column, or record, for example. From the correspondence table, the computer system can acquire the table, column, or record associated with the retrieval target to generate the difference retrieval request. After completion of the generation, the processing proceeds to step 205.

In step 205, the computer system transmits the generated difference retrieval request to the back-end database. The computer system performs, on the back-end database, the difference retrieval request transmitted. Then, the computer system transmits the result to the in-memory database. After the transmission, the processing proceeds to step 206.

In step 206, the computer system applies the transmitted result to the in-memory database. After completion of the application, the processing proceeds to step 207.

In step 207, the computer system records the time of application in a log, a memory within a process of the in-memory database, or the in-memory database itself, for example. After completion of the recording, the processing proceeds to step 208.

In step 208, the computer system performs the current retrieval request on the in-memory database. As a result, a retrieval response is returned to the retrieval request issuing side. After that, the processing proceeds to step 209.

The processing is ended at step 209.

The execution of the above-mentioned steps 201 to 209 brings in the following effects:

Current retrieval requests or the future retrieval requests are classified into retrieval requests that require data currency and retrieval requests that do not require data currency (step 202). Therefore, it is avoided that any retrieval request that does not require data currency is performed on the back-end database, and hence the load placed on the back-end database can be reduced.

It is determined how new the data set is enough to be retrieved according to a retrieval request that requires data currency (step 204), so that as many data sets as possible are retrieved from the in-memory database. Thus, the number of accesses to the back-end database can be reduced compared with the case where the determination is not made.

The difference retrieval request can be simpler than the issued retrieval request. Simple retrieval processing means retrieval processing with fewer retrieval conditions, for example. For example, while the issued retrieval request is a request for retrieving a certain column of a certain record included in a certain table (hereinafter referred to as "complicated retrieval request"), the difference retrieval request can be a request for retrieving only the certain table (hereinafter referred to as "simple retrieval request"). Therefore, when the difference retrieval request is created, such a case that the complicated retrieval request is passed through to the back-end database and performed can be reduced, for example.

The in-memory database is synchronized with the back-end database (step 207). This synchronization is done using a differential data set, so that the amount of read data is less than the amount in the case where the synchronization is done using all data sets.

The above effects 1 to 4 can reduce the load placed on the back-end database.

Further, the processing shown in FIG. 2A can be combined with a pass-through retrieval method to reduce the load placed on the back-end database more effectively. In such a combined method, if the load of processing for acquiring the retrieval response from the back-end database is expected to be smaller than that of processing for acquiring the differential data from the back-end database, the issued retrieval request is passed through. This pass-through can reduce the load placed on the back-end database compared with that using the method shown in FIG. 2A.

Figure 2B:
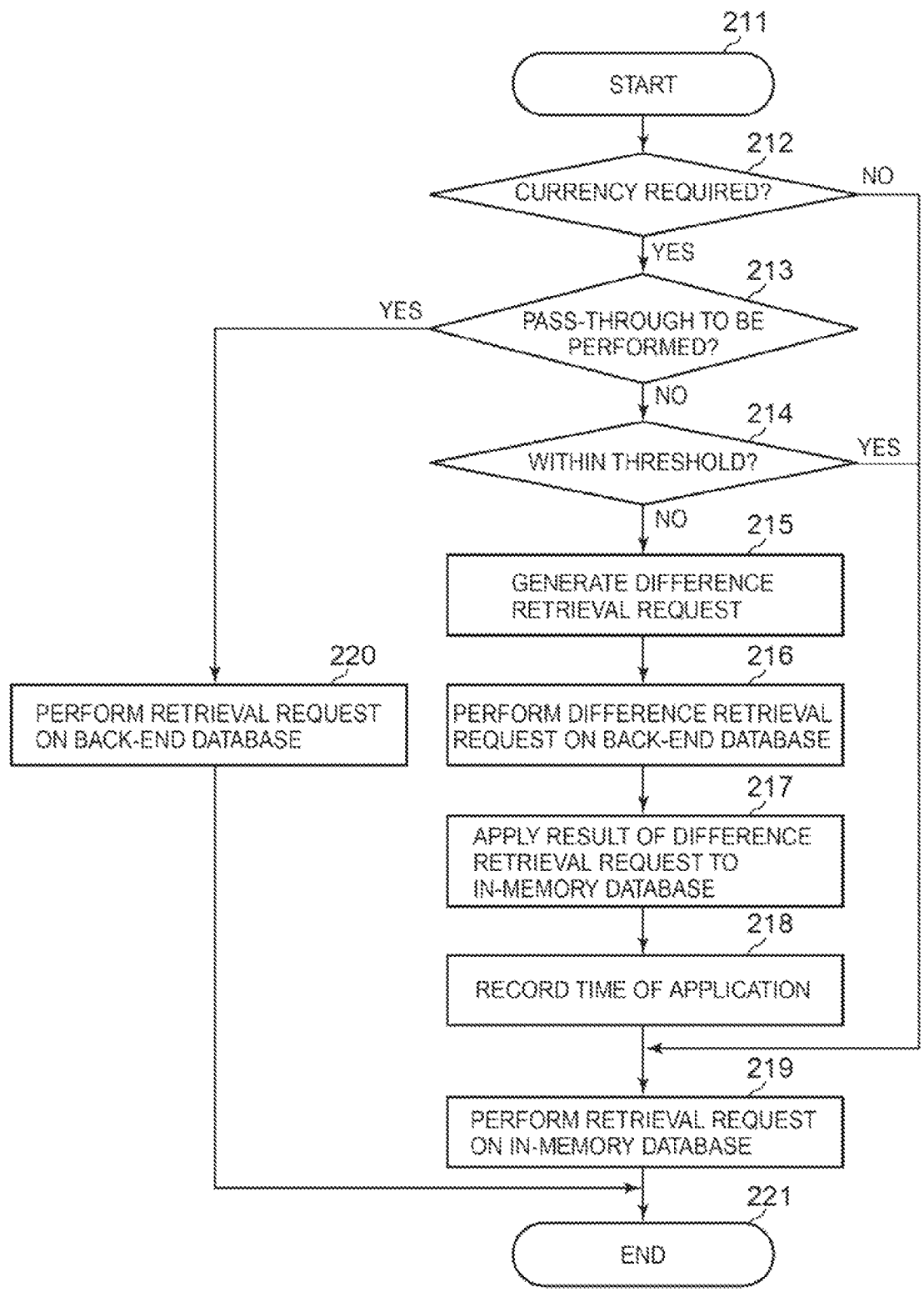
FIG. 2B is a flowchart showing an example of processing steps in such a case that the processing shown in FIG. 2A is combined with a method using pass-through retrieval in the embodiment of the present invention.

FIG. 2B shows an example of processing steps in such a case that the processing shown in FIG. 2A is combined with a method using pass-through retrieval in the embodiment of the present invention. The computer system executes the following steps 211 to 221 in response to issuing a retrieval request to the in-memory database. Note that the retrieval request to be passed through is the current retrieval request. Therefore, steps 211 to 221 are not executed on the future retrieval request. When data to be retrieved according to the future retrieval request is replicated while passing through the current retrieval request, the computer system has only to execute steps 211 to 221 of FIG. 2B on the current retrieval request, and steps 201 to 207 of FIG. 2A on the future retrieval request.

The above processing starts at step 211.

In step 212, the computer system determines whether the issued retrieval request is a retrieval request that requires currency. In this determination, the computer system determines whether a declaration included in the issued retrieval request is listed in the first list in which declarations of retrieval requests that require currency are listed. If the declaration included in the issued retrieval request is included in the list, the processing proceeds to step 213. On the other hand, if it is not included, the processing proceeds to step 219.

In step 213, the computer system determines whether the issued retrieval request should be passed through to the back-end database. Here, the user prepares beforehand a list (hereinafter referred to as "third list") in which declarations of retrieval requests as pass-through targets or declarations of retrieval requests with flags indicative of the presence or absence of pass-through are listed, for example. The third list may be in common with the first list. From the third list, the computer system determines whether the issued retrieval request should be passed through. If it is determined to be passed through, the processing proceeds to step 220. On the other hand, if it is determined not to be passed through, the processing proceeds to step 214.

Whether it should be passed through or not may be determined from statistical data. The computer system determines whether to pass through each retrieval request at random, for example. The computer system records, in a log or the like, the response time per request when passed through and the response time per request when not passed through. When a certain number of response times for respective retrieval requests, e.g., 20 records, are accumulated, the computer system calculates an average value of the response times for the respective retrieval requests in both cases when passed through and when not passed through, respectively. Here, suppose that the average value in the case when passed through is shorter. In this case, when any of the retrieval requests for which the average value of the response times was calculated has further been issued, the computer system determines that it should always be passed through without making the random determination. Conversely, suppose that the average value in the case when passed through is longer. In this case, when any of the retrieval requests for which the average value of the response times was calculated has further been issued, the computer system determines that it should not always be passed through without making the random determination.

In step 220, the computer system passes through the issued retrieval request. As a result of this pass-through, the computer system performs the issued retrieval request on the back-end database. After that, the computer system returns a retrieval response as the result to the retrieval request issuing side. After the retrieval response is returned, the processing proceeds to step 221.

Here, the computer system does not need to apply, to the in-memory database, the retrieval response acquired by the pass-through retrieval. The retrieval response can be held by an existing technique called a result cache. The result cache is a cache in which the results of requests issued to the database are held.

In step 214, the computer system determines whether the time (past application time) at which the data set as the retrieval target of the issued retrieval request was applied in the past is within the currency threshold value. The past application time means the time of recording the data set in a log or the like in step 218 to be described later when the issued current retrieval request was issued in the past. The computer system calculates a difference between the issue time of the retrieval request and the past application time. If the calculated difference is within a threshold value corresponding to the declaration of the issued retrieval request listed in the first list, the processing proceeds to step 219. On the other hand, if the difference is beyond the threshold value, the processing proceeds to step 215.

In step 215, the computer system generates a difference retrieval request. The difference retrieval request is a request for retrieving, from the back-end database, differential data between a data set applied to the in-memory database and a data set at the issue time of the retrieval request. For example, the difference retrieval request is to retrieve a table, column, or record to which the retrieval target of the issued retrieval request belongs, but is not limited thereto. Further, the table, column, or record may be one or more. If a command for performing replication is prepared beforehand in a database used, the command may be used as the difference retrieval request. Further, for example, the difference retrieval request may be a request for retrieving a table item or record associated with the retrieval target of the issued retrieval request. The user creates beforehand a correspondence table showing a relationship between the issued retrieval request and a table, column, or record, for example. From the correspondence table, the computer system can acquire the table, column, or record associated with the retrieval target to generate the difference retrieval request. After completion of the generation, the processing proceeds to step 216.

In step 216, the computer system transmits the generated difference retrieval request to the back-end database. The computer system performs, on the back-end database, the difference retrieval request transmitted. Then, the computer system transmits the result to the in-memory database. After the transmission, the processing proceeds to step 217.

In step 217, the computer system applies the transmitted result to the in-memory database. After completion of the application, the processing proceeds to step 218.

In step 218, the computer system records the time of application in a log, a memory within a process of the in-memory database, or the in-memory database itself, for example. After completion of the recording, the processing proceeds to step 219.

In step 219, the computer system performs the retrieval request issued to the in-memory database. As a result, a retrieval response is returned to the retrieval request issuing side. After that, the processing proceeds to step 220.

The processing is ended at step 221.

When the processing steps shown in FIG. 2A and FIG. 2B are execute, the response time for the retrieval request that requires currency can become long. When the retrieval request that requires currency is issued, the computer system first completes the synchronization processing between the in-memory database and the back-end database, except for the case where the retrieval request is passed through. The retrieval processing is performed on the in-memory database after completion of the synchronization processing. Thus, compared with the case where the synchronization processing is not performed, the response time can become long. In order to improve the problem that the response time becomes long, an anticipated synchronization method may be executed in addition to the processing shown in FIG. 2A or FIG. 2B. In the anticipated synchronization method, the time at which synchronization processing for a data set as a target of a retrieval request (future retrieval request) expected to be issued in the near future in response to issuing a retrieval request (current retrieval request) is performed is determined, and the synchronization processing is performed at the determined time. Thus, the anticipated synchronization method is a method in which the synchronization processing can be performed before the issue of the future retrieval request. The anticipated synchronization method can increase the possibility that a retrieval response to a retrieval request that requires data currency would have already been read into the in-memory database when the retrieval request was issued. Thus, the response time for the retrieval request that requires data currency and the response time for the retrieval request that does not require data currency can become almost the same, and hence the problem that the response time for the retrieval becomes long can be improved.

Figure 2C:
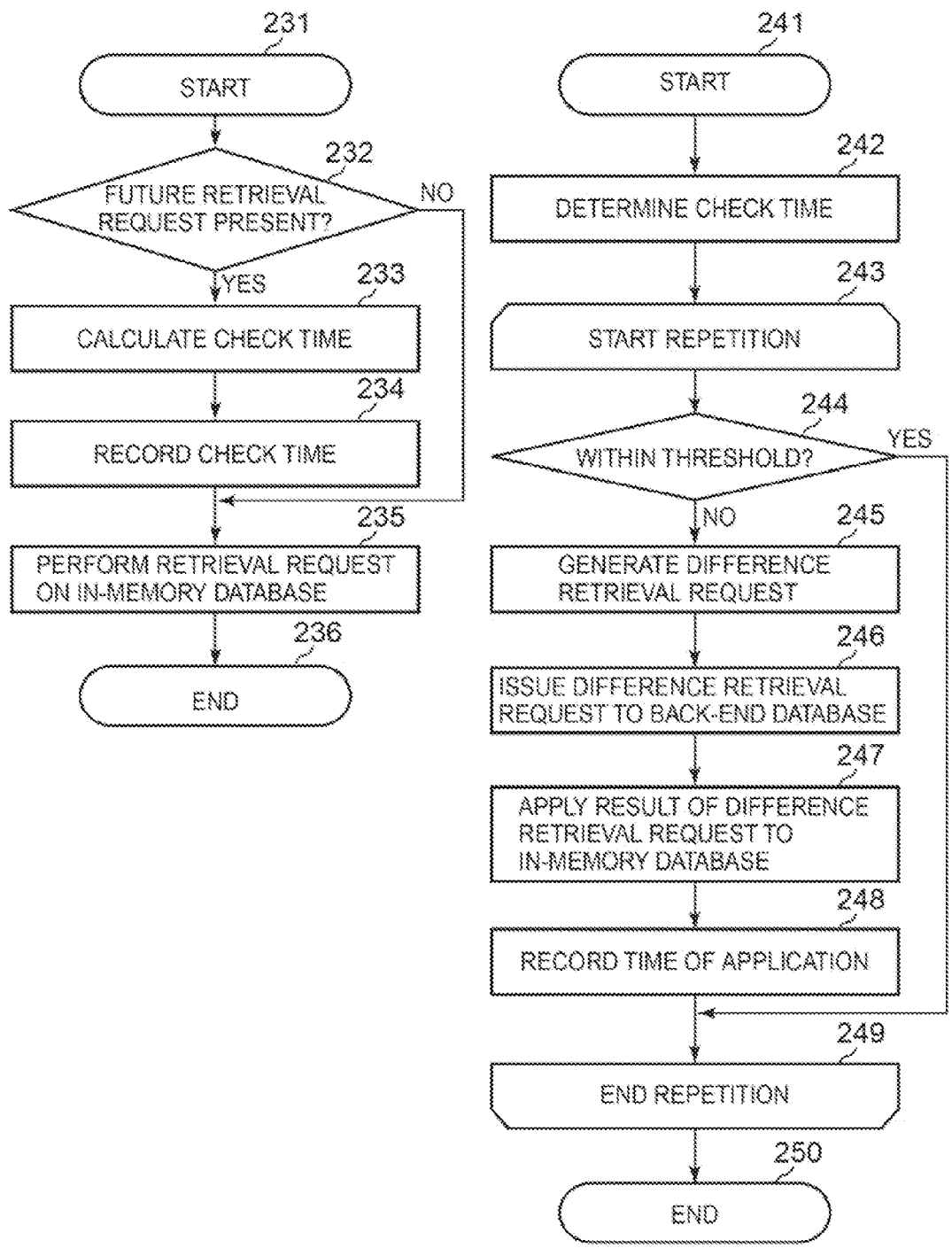
FIG. 2C is a flowchart showing an example of anticipated synchronization processing steps executed in the system shown in FIG. 1B in the embodiment of the present invention.

FIG. 2C shows an example of anticipated synchronization processing steps executed in the system shown in FIG. 1B in the embodiment of the present invention. The computer system executes the following steps 231 to 236 in response to issuing a retrieval request to the in-memory database. Here, respective steps shown in FIG. 2A or FIG. 2B may be performed in parallel. Further, the computer system executes the following steps 241 to 250 periodically, or at a time specified by the user, or at specified time intervals.

Processing performed in response to issuing the current retrieval request starts at step 231.

In step 232, the computer system determines whether a future retrieval request corresponding to the current retrieval request and requiring currency is present. In this determination, the computer system retrieves, from the second list, a declaration of the future retrieval request corresponding to the current retrieval request. As a result of this retrieval, if declarations of one or more future retrieval requests are found, the processing proceeds to step 233. On the other hand, if no declaration is found, the processing proceeds to step 235.

In step 233, the computer system calculates a check time for each of the future retrieval requests found, respectively. The check time is the time to determine whether a retrieval target of each of the future retrieval requests found should be synchronized. For this calculation, a time expected to issue each future retrieval request and a threshold value for the future retrieval request can be used. The user records the expected time and the threshold value, associated with the declaration of each of the future retrieval requests in the second list beforehand in the second list or in a new fourth list. The computer system acquires, from the second list or the fourth list, the expected time and threshold value corresponding to each of the future retrieval requests found. The threshold value may be acquired from the first list. It is preferred that the check time be within the threshold value. Thus, for example, the calculation is made as "Expected Time-Threshold Value*n (0<=n<=1)," for example. The user can set the check time voluntarily. After the check time for each of the future retrieval requests found is calculated, respectively, the processing proceeds to step 234.

In step 234, the computer system records combinations of future retrieval requests and check times in a list (hereinafter referred to as "fifth list") in chronological order, for example. After completion of the recording, the processing proceeds to step 235.

In such an implementation that each processing shown in FIG. 2A or FIG. 2B is not performed, the computer system performs the current retrieval request in step 235 on the in-memory database. As a result, a retrieval response is returned to the current retrieval request issuing side. After that, the processing proceeds to step 236.

The processing performed in response to issuing the current retrieval request is ended at step 236.

At step 241, processing performed periodically, or at a time specified by the user, or at specified time intervals is started.

In step 242, the computer system acquires a combination of a future retrieval request and a check time from the fifth list to determine the check time. In this determination, it is determined whether the check time is earlier than or the same as the current time. Steps 243 to 249 that follow are executed on the future retrieval request combined with the check time determined to be earlier than or the same as the current time.

Loop processing for each future retrieval request combined with the time determined to be earlier than or the same as the current time starts at step 243.

In step 244, the computer system determines whether the time (past application time), at which a data set as the retrieval target of each of the future retrieval requests in the combinations acquired was applied to the in-memory database in the past, is within the currency threshold value. The past application time means the time of recording the data set as the retrieval target of the future retrieval request in a log or the like in step 248 to be described later when the data set was applied in the past to the in-memory database. The computer system calculates a difference between the current time and the past application time. If the calculated difference is within the threshold value corresponding to the declaration of the future retrieval request listed in the first, second, or fourth list, the processing proceeds to step 249.

On the other hand, if the difference is beyond the threshold value, the processing proceeds to step 245.

In step 245, the computer system generates a difference retrieval request. The difference retrieval request is a request for retrieving, from the back-end database, differential data between a data set applied to the in-memory database and a data set at the current time. For example, the difference retrieval request is to retrieve a table, column, or record to which the retrieval target of the future retrieval request belongs, but is not limited thereto. Further, the table, column, or record may be one or more. If a command for performing replication is prepared beforehand in a database used, the command may be used as the difference retrieval request. Further, for example, the difference retrieval request may be a request for retrieving a table, column, or record associated with the retrieval target of the issued retrieval request. The user creates beforehand a correspondence table showing a relationship between the issued retrieval request and a table, column, or record, for example. From the correspondence table, the computer system can acquire the table, column, or record associated with the retrieval target to generate the difference retrieval request. After completion of the generation, the processing proceeds to step 246.

In step 246, the computer system transmits the generated difference retrieval request to the back-end database. The computer system performs, on the back-end database, the difference retrieval request transmitted. Then, the computer system transmits the result to the in-memory database. After the transmission, the processing proceeds to step 247.

In step 247, the computer system applies the transmitted result to the in-memory database. After completion of the application, the processing proceeds to step 248.

In step 248, the computer system records the time of application in a log, a memory within a process of the in-memory database, or the in-memory database itself, for example. After completion of the recording, the processing proceeds to step 249.

This loop processing is ended at step 249.

Then, the processing performed periodically, or at a time specified by the user, or at specified time intervals is ended at step 250.

Each processing step shown in FIG. 2A to FIG. 2C can be executed in such a manner to be incorporated into a retrieval processing section of the in-memory database, for example. This implementation in which each processing step is incorporated into the retrieval processing section will be the simplest example to understand the embodiment of the present invention. However, a case can also be considered where the incorporation is difficult because the retrieval processing section of the in-memory database is already commercialized as a product, for example. Therefore, the following describes an example of implementing the embodiment of the present invention without directly altering the retrieval processing section of the in-memory database already commercialized as a product. In this example, Java® language is used, but the language used for the implementation is not limited to Java® language.

Figure 3A:
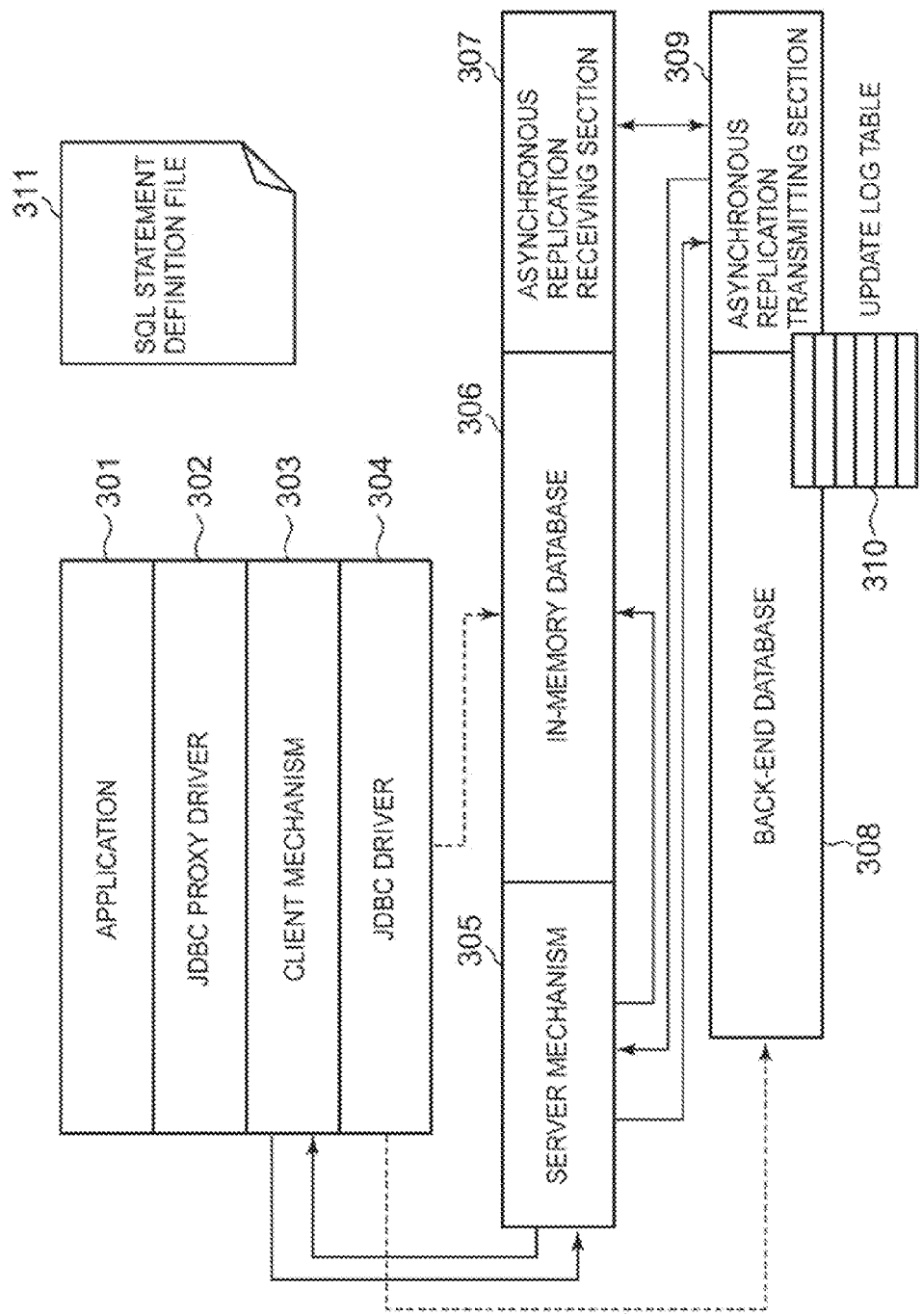
FIG. 3A shows an example of implementation of the system configuration shown in FIG. 1B using a JDBC proxy driver in the embodiment of the present invention.

FIG. 3A shows an example in which the system configuration shown in FIG. 1B is implemented using a JDBC proxy driver. An application (301) is a Java® application for receiving a retrieval request from a user, for example. A JDBC proxy driver (302) is a JDBC driver wrapping a JDBC driver (304). In the JDBC proxy driver (302), operations relating to databases can be performed instead of the JDBC driver (304). Further, the wrapping enables the JDBC proxy driver (302) to provide the application (301) with an API for operating databases instead of the JDBC driver (304).

Mechanisms for implementing the embodiment of the present invention (hereinafter referred to as "mechanisms of the present invention) are incorporated into the JDBC proxy driver (302). Thus, in connection with the mechanisms of the present invention, the operations relating to the databases and the provision of the API are done by the JDBC proxy driver (302). Among the mechanisms of the present invention incorporated in the JDBC proxy driver (302), a client mechanism (303) in the embodiment of the present invention is a mechanism on a computer running the application (301). The real JDBC driver (304) is a JDBC driver with which the operations relating to the databases are performed. The JDBC driver (304) can also provide the application (301) with the API for operating the databases. Further, among the mechanisms of the present invention incorporated in the JDBC proxy driver (302), a server mechanism (305) in the embodiment of the present invention is a mechanism on a computer managing an in-memory database (306). The in-memory database (306) is a database holding at least one piece of data included in a backup database (308). When data included in the backup database (308) is replicated to the in-memory database (306), an asynchronous replication receiving section (307) receives update data to be replicated. The back-end database (308) is a main database in the implementation example. The update of data is performed only on the back-end database (308). When data included in the back-end database (308) is replicated to the in-memory database (306), an asynchronous replication transmitting section (309) transmits update data to be replicated. An update log table (310) is a table storing update information for the back-end database (308). The update information includes updated data and update time. Instead, the update information may include an SQL statement for updating the data and the update time. An SQL statement definition file (311) is a file storing user-defined information. This file is an XML file, a text file, or a binary file, for example. The SQL statement definition file (311) corresponds to the first to fifth lists. In the SQL statement definition file (311), declarations of SQL statements that require data currency, and table names and threshold values as targets of the synchronization processing performed according to the respective SQL statements are prepared by the user beforehand. The declaration of each SQL statement is a declaration passed as a character string of JDBCjava.sql.Connection#prepareStatement method. Further, in the SQL statement definition file (311), a declaration of an SQL statement, which is expected to be issued for a given SQL statement in the near future after the issue of the given SQL statement and which requires data currency, and an expected issue time indicating in how many seconds the expected SQL statement is issued for the given SQL statement are prepared by the user beforehand.

Figure 3B:
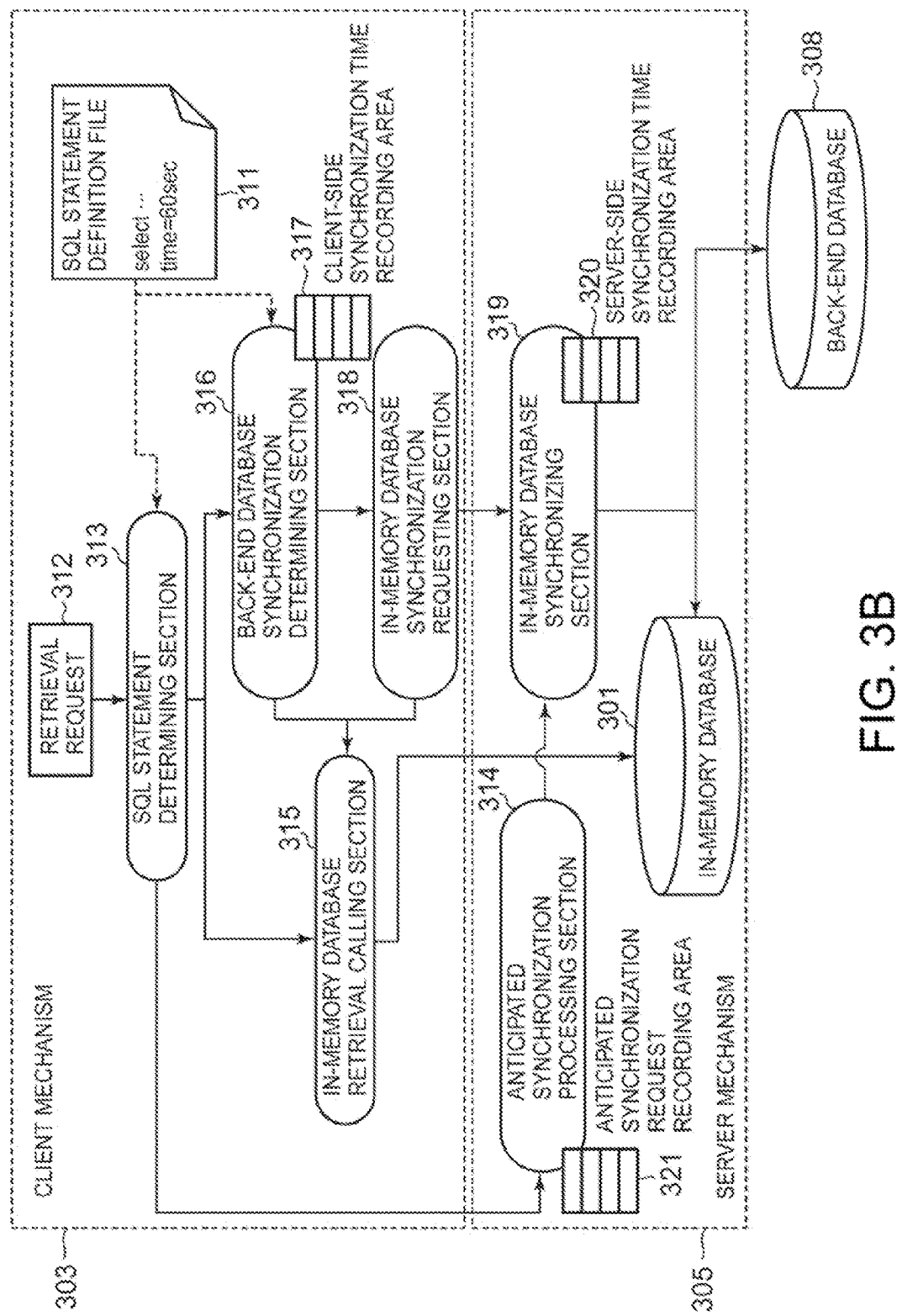
FIG. 3B shows the details of a client mechanism (303) and a server mechanism (305) shown in FIG. 3A in the embodiment of the present invention.

FIG. 3B shows the details of the client mechanism (303) and the server mechanism (305) shown in FIG. 3A in the embodiment of the present invention.

The following describes a periodic replication operation with reference to FIG. 3A and FIG. 3B. In response to updates of data in the back-end database (308), the computer system records the update logs in the update log table (310), respectively. The asynchronous replication transmitting section (309) references the update log table (310) at constant time intervals. Then, the asynchronous replication transmitting section (309) collectively transmits, to the asynchronous replication receiving section (307), multiple update logs found during the reference. Upon receipt of the update logs transmitted, the asynchronous replication receiving section (307) performs data updates of the update logs on the in-memory database (306). After completion of the updates, the asynchronous replication receiving section (307) notifies the asynchronous replication transmitting section (309) of the completion of replication. The asynchronous replication transmitting section (309) that has received the notification of completion deletes, from the update log table (310), the update logs of the data updated on the in-memory database (306). Here, when the in-memory database (306) and the back-end database (308) are synchronized, the server mechanism (305) in the embodiment of the present invention records the time of synchronization in a server-side synchronization time recording area (320).

The following describes an operation upon starting the application (301) with reference to FIG. 3A and FIG. 3B. When the application (301) is started and the JDBC driver (304) is initialized, the client mechanism (303) reads the SQL statement definition file (311) and stores, in a memory or the like, information (hereinafter referred to as "definition file") recorded in the SQL statement definition file (311). Declarations of SQL statements registered in the SQL statement definition file (311) are registered in java.util.HashSet.

The following describes an operation for issuing a retrieval request (312) from the application (301). When an SQL statement (hereinafter referred to as "current SQL statement") as a retrieval request is issued from the application (301) to the JDBC proxy driver (302), an SQL statement determining section (313) embedded in the JDBC proxy driver (302) receives the current SQL statement. The SQL statement determining section (313) determines whether a declaration of an SQL statement (hereinafter referred to as "future SQL statement") corresponding to the declaration of the received current SQL statement and to be issued in the near future is registered in the information from the definition file. If registered, the SQL statement determining section (313) acquires a threshold value, expected issue time, and table name as the target of synchronization processing, which correspond to the declaration of the future SQL statement stored as the information from the definition file. The SQL statement determining section (313) issues, to an anticipated synchronization processing section (314) of the server mechanism (305), an anticipated synchronization request including the acquired threshold value, expected issue time, and target table. After completion of the issue, the SQL statement determining section (313) determines whether the declaration of the current SQL statement issued from the application (301) using prepareStatement method and passed as an argument of the method is registered in the java.util.HashSet as a declaration of a certain SQL statement that requires data currency. If the declaration of the current SQL statement is not registered, the SQL statement determining section (313) determines that the retrieval request according to the current SQL statement is a retrieval request that does not require data currency. In response to the determination that it is a retrieval request that does not require data currency, the SQL statement determining section (313) calls an in-memory database retrieval calling section (315). The in-memory database retrieval calling section (315) searches the in-memory database (301) using the current SQL statement. The query result is returned to the application (301), and this retrieval processing is ended.

On the other hand, if the declaration of the current SQL statement is registered, the SQL statement determining section (313) determines that the retrieval request according to the current SQL statement is a retrieval request that requires data currency. In response to the determination that it is a retrieval request that requires data currency, the SQL statement determining section (313) acquires a table name as a target corresponding to the current SQL statement and a threshold value from the definition file. Then, the SQL statement determining section (313) specifies the acquired, target table name and threshold value, and issues a data synchronization request to a back-end database synchronization determining section (316). Upon receipt of the data synchronization request, the back-end database synchronization determining section (316) determines whether the in-memory database (301) and back-end database (308) should be synchronized for the retrieval of the current SQL statement. In this determination, the time of the last synchronization with the table as the target specified in the data synchronization request is first acquired from the client-side synchronization time recording area (317). Next, an elapsed time since the acquired time and the threshold value specified in the data synchronization request are compared. As a result of the comparison, if the elapsed time is within the threshold value, the back-end database synchronization determining section (316) determines that the synchronization is not necessary. In response to the determination that the synchronization is not necessary, the back-end database synchronization determining section (316) calls an in-memory database retrieval calling section (315). The in-memory database retrieving section (315) searches the in-memory database (301) using the current SQL statement. This result is returned to the application (301), and the retrieval processing is ended.

On the other hand, as a result of the comparison, if the elapsed time is larger than the threshold value, the back-end database synchronization determining section (316) determines that the synchronization should be made. In response to the determination that the synchronization should be made, the back-end database synchronization determining section (316) calls an in-memory database synchronization requesting section (318). The in-memory database synchronization requesting section (318) acquires a table name as a target corresponding to the current SQL statement and a threshold value from information from the definition file. Then, the in-memory database synchronization requesting section (318) specifies the acquired, target table name and threshold value, and calls a server-side in-memory database synchronizing section (319) through communication. The in-memory database synchronization requesting section (318) waits for completion of the calling activity.

The in-memory database synchronizing section (319) references the update time of the table as the specified target in the server-side synchronization time recording area (320). From the referenced update time and the specified threshold value, the in-memory database synchronizing section (319) determines whether synchronization is necessary. If an elapsed time since the referenced update time is within the threshold value, the in-memory database synchronizing section (319) determines that synchronization is not necessary. In response to the determination that the synchronization is not necessary, the in-memory database synchronizing section (319) specifies the referenced update time and returns the completion of processing to the in-memory database synchronization requesting section (318). Upon receipt of the completion of processing, the in-memory database synchronization requesting section (318) updates the synchronization time concerning the target table in the client-side synchronization time recording area (317) to the specified update time. After completion of the update, the in-memory database synchronization requesting section (318) calls the in-memory database retrieval calling section (315). The in-memory database retrieving section (315) searches the in-memory database (301) using the current SQL statement. This result is returned to the application (301), and the retrieval processing is ended On the other hand, if the elapsed time since the update time is larger than the threshold value, the in-memory database synchronizing section (319) determines that synchronization is necessary. In response to the determination that the synchronization is necessary, the in-memory database synchronizing section (319) issues a data synchronization request to the asynchronous replication transmitting section (309 in FIG. 3A) of the back-end database. Upon receipt of the data synchronization request, the asynchronous replication transmitting section (309) retrieves, from the update log table (310), an update log on the target table added after the time of the last replication. If logs are assigned serial numbers, this retrieval will be to retrieve a log record having a serial number larger than that of the last retrieved log. Then, the asynchronous replication transmitting section (309) transmits the retrieved update log to the asynchronous replication receiving section (307). The asynchronous replication receiving section (307) that has received the update log updates the in-memory database using the update log. After completion of the update, the asynchronous replication receiving section (307) updates the synchronization time concerning the target table in the server-side synchronization time recording area (320) to the current time. After completion of the update, the asynchronous replication receiving section (307) notifies the asynchronous replication transmitting section (309) of the completion of the update of the in-memory database. Upon receipt of the notification, the asynchronous replication transmitting section (309) passes, to the in-memory database synchronizing section (319), a response to the data synchronization request. The updated synchronization time is added to the response. The in-memory database synchronizing section (319) that has received the response updates the synchronization time concerning the target table in the client-side synchronization time recording area (317) to the updated synchronization time. After completion of the update, the in-memory database synchronization requesting section (318) calls the in-memory database retrieval calling section (315). The in-memory database retrieving section (315) searches the search in-memory database (301) using the current SQL statement. This result is returned to the application (301), and this retrieval processing is ended.

The following describes the operation of the anticipated synchronization processing section (314) with reference to FIG. 3A and FIG. 3B. The anticipated synchronization processing section (314) performs the following processing when an anticipated synchronization request has been issued. Namely, upon receipt of the anticipated synchronization request issued by the SQL statement determining section (313), the anticipated synchronization processing section (314) calculates a check time for the anticipated processing request. The check time can be calculated from the threshold value and expected time included in the anticipated processing request. Although various methods of calculating the check time can be considered, the check time is calculated as Expected Time-Threshold/2 in this example. After the check time is calculated, the anticipated synchronization processing section (314) accumulates, in an anticipated synchronization request recording area (321), combinations of check times, threshold values included in respective anticipated processing requests, expected times, and target table names in order of check time.

Further, the anticipated synchronization processing section (314) performs the following processing periodically.

Namely, the anticipated synchronization processing section (314) acquires the combinations accumulated in the anticipated synchronization request recording area (321). In other words, the combinations acquired are all combinations, each of which has a check time earlier than the current time, and which starts from a combination stored in the top of the anticipated synchronization request recording area (321). The combinations acquired here are deleted from the anticipated synchronization request recording area (321). The anticipated synchronization processing section (314) acquires, from the server-side synchronization time recording area (320), the time of the last synchronization concerning the target table included in each of the acquired combinations. Next, from the acquired time of the last synchronization, the expected time included in the combination, and the threshold value included in the combination, the anticipated synchronization processing section (314) determines whether to request synchronization processing for each target table. In this determination, Expected Time-Threshold is calculated. If the calculated value is smaller than the time of the last synchronization, it is determined that synchronization processing for the corresponding table is unnecessary. If the calculated value is larger than the time of the last synchronization and does not exceed the current time, it is determined that synchronization processing for the corresponding table is necessary. If the calculated value exceeds the current time, it is determined that synchronization processing for the corresponding table is unnecessary. The anticipated synchronization processing section (314) issues, to the in-memory database synchronizing section (319), a request for synchronization processing on each corresponding table for which it is determined that synchronization processing is necessary.

Referring next to FIG. 3A and FIG. 3B, the following describes how to perform replication when a request for synchronization processing is issued from the anticipated synchronization processing section (314).

Upon receipt of the request for synchronous processing, the in-memory database synchronizing section (319) issues a data synchronization request to the asynchronous replication transmitting section (309) of the back-end database. Upon receipt of the data synchronization request, the asynchronous replication transmitting section (309) retrieves, from the update log table (310), an update log concerning the target table added after the time of the last replication. If logs are assigned serial numbers, for example, this retrieval will be to retrieve a log record having a serial number larger than that of the last retrieved log. Then, the asynchronous replication transmitting section (309) transmits the retrieved update log to the asynchronous replication receiving section (307). The asynchronous replication receiving section (307) that has received the update log updates the in-memory database using the update log. After completion of the update, the asynchronous replication receiving section (307) updates the synchronization time concerning the target table in the server-side synchronization time recording area (320) to the current time. After completion of the update, the asynchronous replication receiving section (307) notifies the asynchronous replication transmitting section (309) of the completion of the update of the in-memory database. Upon receipt of the notification, the asynchronous replication transmitting section (309) passes, to the in-memory database synchronizing section (319), a response to the data synchronization request. The updated synchronization time is added to the response. The in-memory database synchronizing section (319) that has received the response updates the synchronization time concerning the target table in the client-side synchronization time recording area (317) to the updated synchronization time.

Referring to FIG. 4A to FIG. 4G, the operation of each step shown in FIG. 2A to FIG. 2C will be described below using specific examples.

Figure 4A:
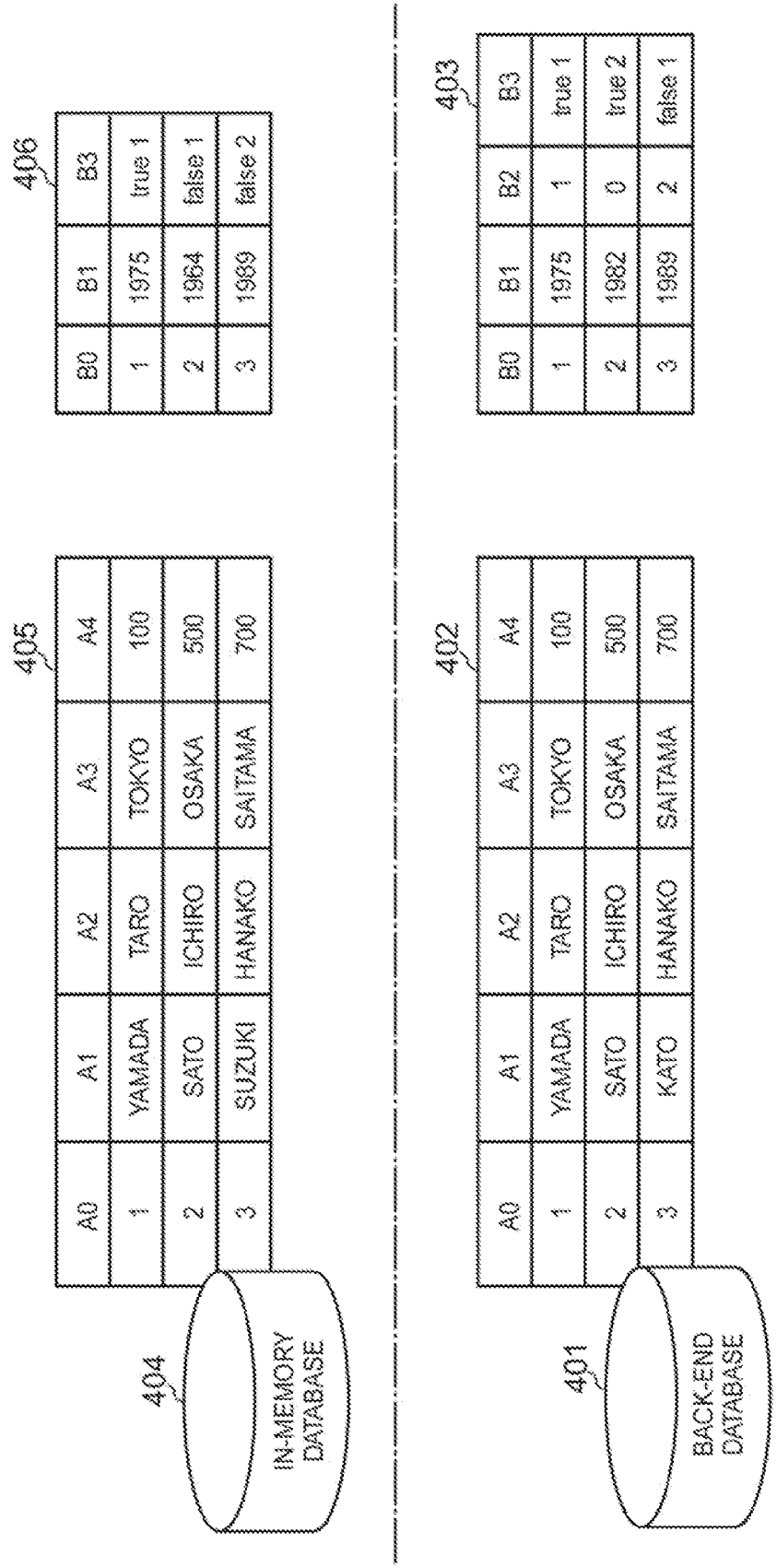
FIG. 4A shows a specific example of databases used for the operation of each step shown in FIG. 2 to FIG. 2C in the embodiment of the present invention.

FIG. 4A shows a specific example of databases used for the operation of each step shown in FIG. 2A to FIG. 2C in the embodiment of the present invention. A back-end database (401) includes table A (402) and table B (403). The table A (402) is a table including columns with column items A0 to A4. The table B (403) is a table including columns with column items B0 to B3. Here, A0 and B0 are column items for listing row numbers, and the row numbers are key items of the table. The in-memory database (404) includes table a (405) and table b (406) replicated from the table A (402) and the table B (403), respectively. The table a (405) is a table including columns with column items A0 to A4 and having the same structure as the table A (402). The table b (406) is a table including columns with column items B0, B1, and B3, and having a structure with column item B2 deleted from the table B (403). Here, suppose that the time of the last replication from the table A (402) to the table a (405) was 14:00. Suppose further that the time of the last replication from the table B (403) to the table b (406) was 15:30.

FIG. 4B shows a specific example of lists used for the operation of each step shown in FIG. 2A to FIG. 2C in the embodiment of the present invention. List (411) is a list in which retrieval requests that require currency, threshold values for the respective retrieval requests, and the presence or absence of pass-through for the respective retrieval requests are specified. The list (411) corresponds to the first to third lists. In the list (411), the following information a1 to a3 is listed:

a1. The retrieval request that requires currency is a "retrieval request for retrieving a column with column item A1," which has a threshold value of "one hour" and is not a pass-through target.

a2. The retrieval request that requires currency is a "retrieval request for retrieving a column with column item A3," which has a threshold value of 30 minutes and is a pass-through target.

a3. The retrieval request that requires currency is a "retrieval request for retrieving table b," which has a threshold value of 6 minutes and is not a pass-through target.

List (412) is a list in which a retrieval request, another retrieval request expected to be issued after the retrieval request, and an expected issue time of the expected retrieval request are specified. The list (412) corresponds to the second and fourth lists. In the list (412), the following information a4 is listed:

a4. The retrieval request is a "retrieval request for retrieving a column with column item A4," the expected retrieval request is a "retrieval request for retrieving table b," and the expected issue time is "in 10 minutes."

Figure 4C:
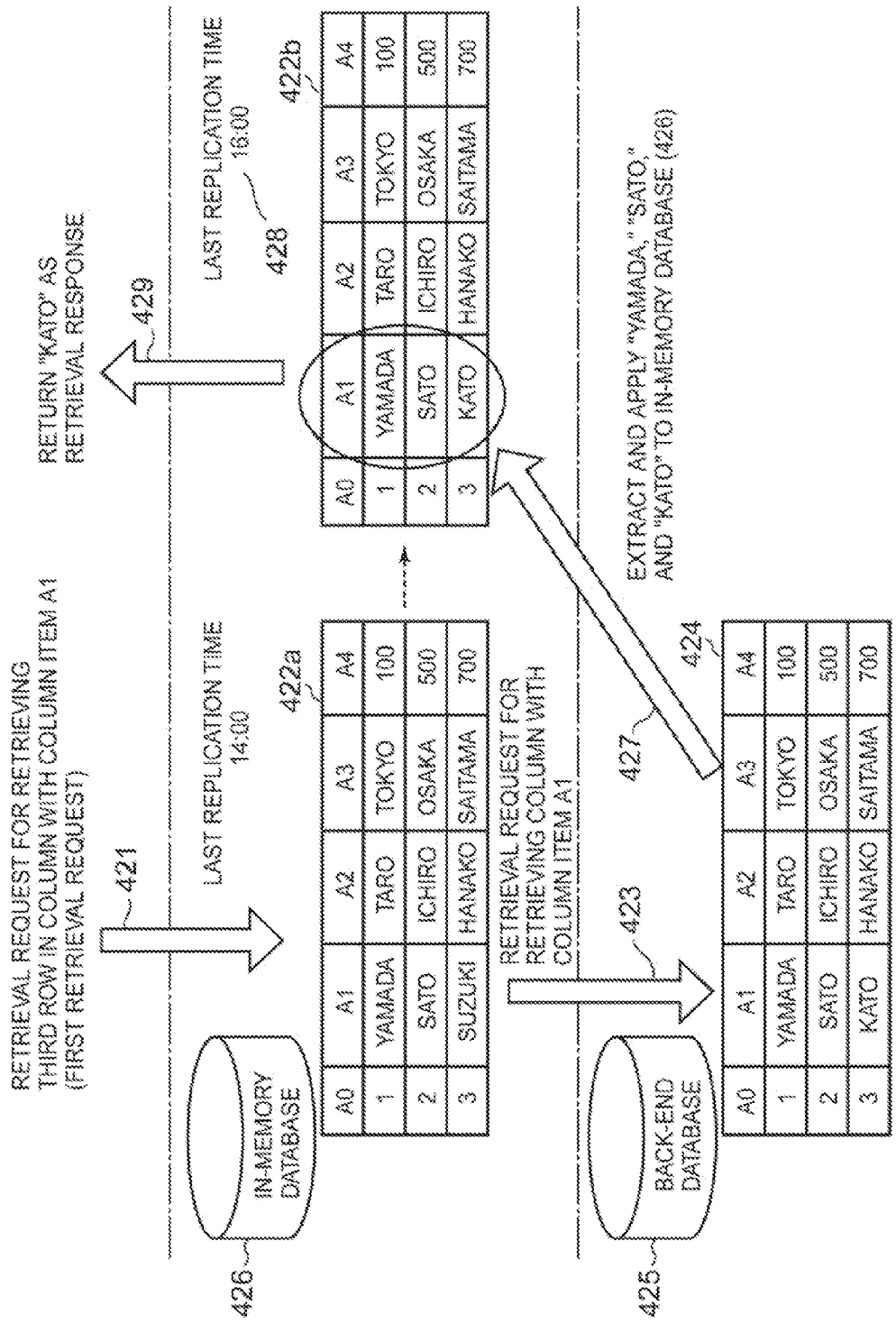
FIG. 4C shows an operation performed when a retrieval request for retrieving the third row in a column with column item A1 has been issued as an example when a retrieval request with data currency required has been issued in the embodiment of the present invention.
Figure 4D:
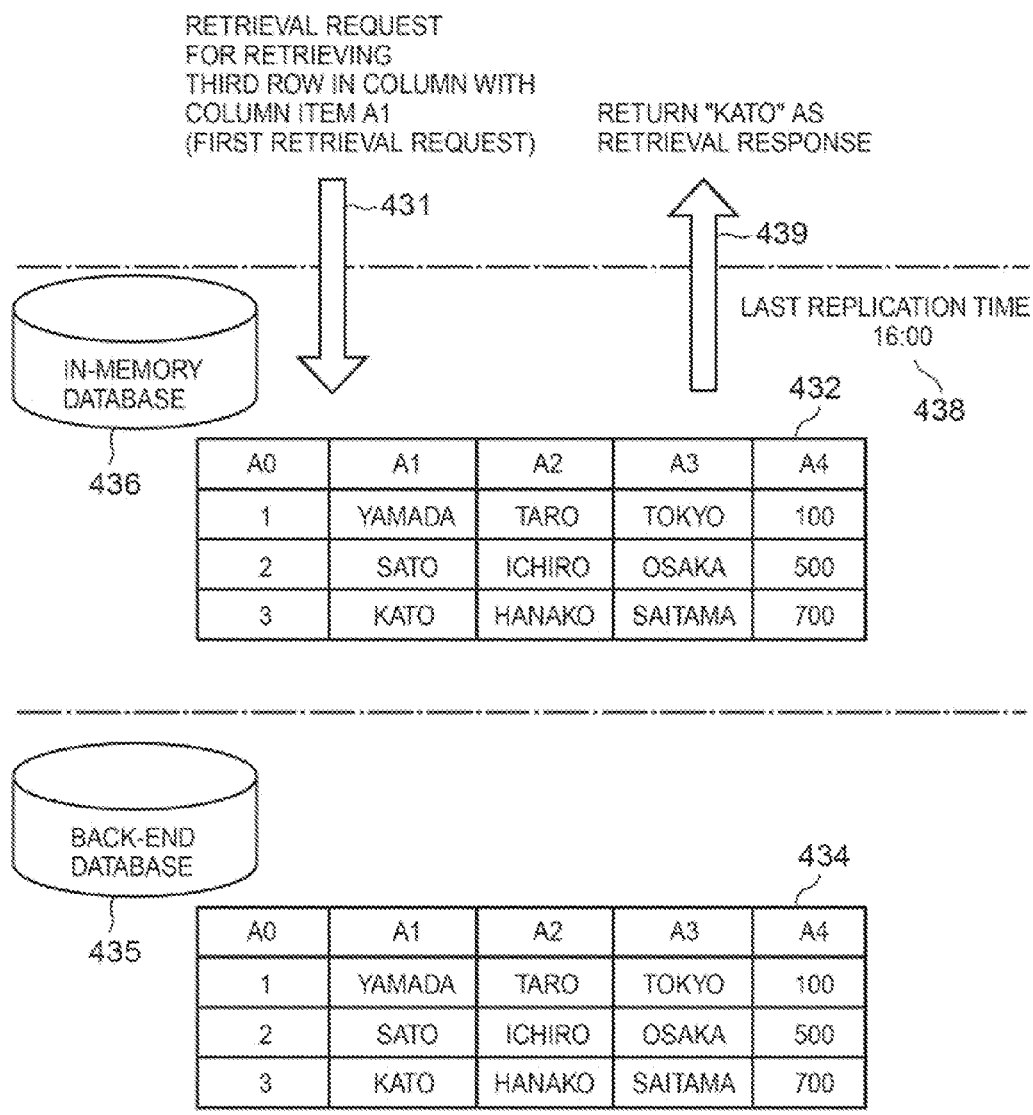
FIG. 4D shows an operation performed when a first retrieval request has been reissued after the processing of FIG. 4C in the embodiment of the present invention.

FIG. 4C shows an operation performed when a retrieval request for retrieving the third row in a column with column item A1 (hereinafter referred to as "first retrieval request (421)) has been issued as an example when a retrieval request, which requires data currency, has been issued in the embodiment of the present invention. Here, it is assumed that the current time is 16:00. When the first retrieval request (421) is issued, the computer system acquires the above information a1 from the list (411 in FIG. 4B). The first retrieval request (421) corresponds to the "retrieval request for retrieving a column with column item A1" described in the above a1 information. Therefore, the computer system determines that the first retrieval request (421) is a retrieval request that requires currency. In response to this determination, the computer system compares the time "14:00" of the last replication to table a (422a) with the current time "16:00" in connection with data related to the first retrieval request (421). The elapsed time since the last replication is 16:00-14:00=two hours, and since this exceeds the threshold value "one hour" described in a1, the computer system determines that data related to the first retrieval request (421) needs synchronization. In response to this determination, the computer system creates a difference retrieval request (423) for extracting a difference between data related to the first retrieval request (421) from the back-end database (425). The difference is, for example, a difference between table A (424) and table a (422a), a difference between a column with column item A1 in the table A (424) and a column with column item A1 in the table a (422a), or a difference between the third row of the table A (424) and the third row of the table a (422a), but it is not limited thereto. For example, when the difference between the column with column item A1 in the table A (424) and the column with column item A1 in the table a (422a) is retrieved, the difference retrieval request (423) is the "retrieval request for retrieving a column with column item A1." In response to the creation of the difference retrieval request (423), the computer system performs the difference retrieval request (423) on the back-end database (425). As a result, the computer system extracts "YAMADA," "SATO," and "KATO" as values in the column with column item A1 of the table A (424), and applies them to the in-memory database (426) (427). As a result of the application, data of the table a (422a) enters a state shown in table a (422b). Further, the computer system records the application time "16:00" in a log or the like (428). In response to the recording, the computer system performs the first retrieval request (421) on the in-memory database (426). As a result, the computer system returns the value "KATO" of the third row in the column with column item A1 to the source of the request (429), and ends the processing FIG. 4D shows an operation performed when the first retrieval request is reissued after the processing of FIG. 4C in the embodiment of the present invention. Here, it is assumed that the current time is 16:30. When the first retrieval request (431) is reissued, the computer system acquires the above informational from the list (411 in FIG. 4B). The first retrieval request (431) corresponds to the "retrieval request for retrieving a column with column item A1" described in the above a1 information. Therefore, the computer system determines that the first retrieval request (431) is a retrieval request that requires currency. In response to this determination, the computer system compares the time of the last replication to table a (432), i.e., the time of application "16:00" (438) with the current time "16:30" in connection with data related to the first retrieval request (431). The elapsed time since the application is 16:30–16:00=30 minutes, and this does not exceed the threshold value "one hour" described in the above a1 information. Therefore, the computer system determines that data related to the first retrieval request (431) does not need synchronization. In response to the determination that synchronization is unnecessary, the computer system performs the first retrieval request (431) on the in-memory database (436). As a result, the computer system returns the value "KATO" in the column with column item A1 to the source of the request (439), and ends the processing.

Figure 4E:
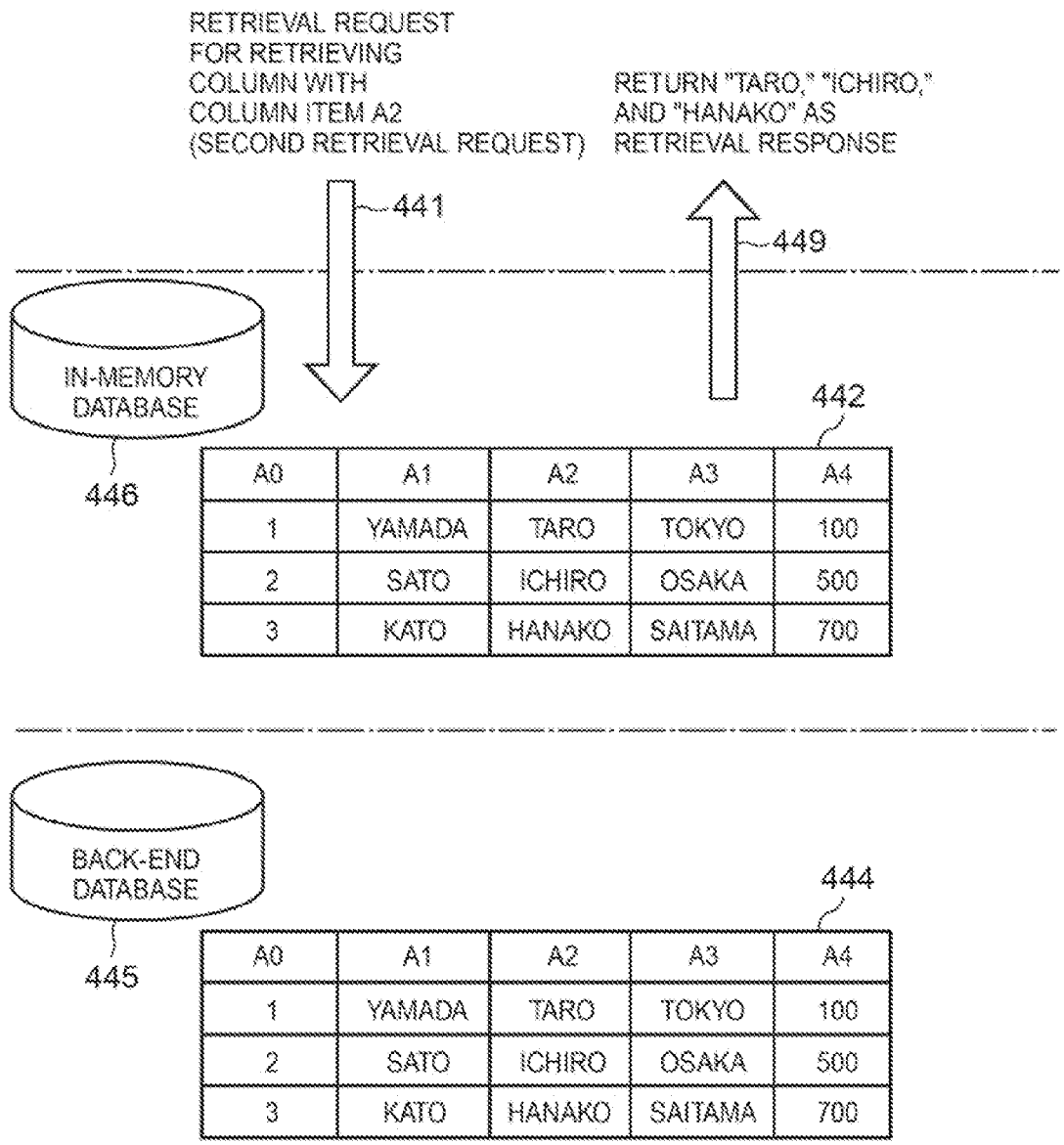
FIG. 4E shows an operation performed when a retrieval request for retrieving a column with column item A2 has been issued as an example when a retrieval request without data currency required has been issued in the embodiment of the present invention.

FIG. 4E shows an operation performed when a retrieval request for retrieving a column with column item A2 (hereinafter referred to as "second retrieval request" (441)) has been issued as an example when a retrieval request that does not require data currency has been issued in the embodiment of the present invention. When the second retrieval request (441) is issued, the computer system searches the list (411 in FIG. 4B). Since the second retrieval request (441) is not included in this list (411 in FIG. 4B), the computer system determines that the second retrieval request (441) is a retrieval request that does not require currency. In response to this determination, the computer system performs the second retrieval request (441) on the in-memory database (446). As a result, the computer system returns "TARO," "ICHIRO," and "HANAKO" as values in the column with column item A2 to the source of the request (449), and ends the processing.

Figure 4F:
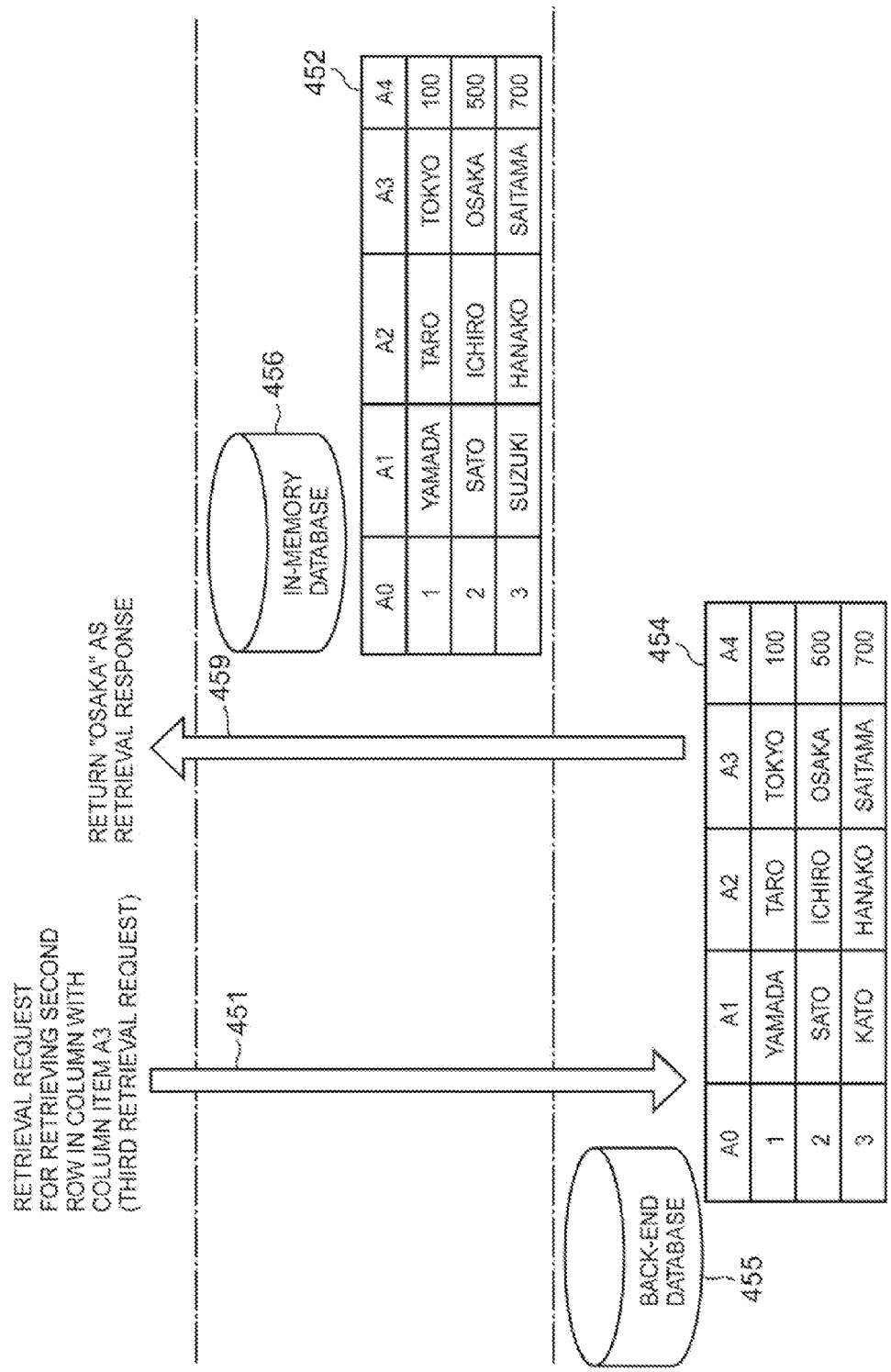
FIG. 4F shows an operation performed when a retrieval request for retrieving the second row in column with column item A3 has been issued as an example when pass-through is performed in the embodiment of the present invention.

FIG. 4F shows an operation performed when a retrieval request for retrieving the second row in a column with column item A3 (hereinafter referred to as "third retrieval request" (451)) has been issued as an example when pass-through is performed in the embodiment of the present invention. When the third retrieval request (451) is issued, the computer system acquires the above a2 information from the list. The third retrieval request (451) corresponds to the "retrieval request for retrieving a column with column item A3" with the presence of "pass-through" as described in the above a2 information. Therefore, the computer system determines that the third retrieval request (451) is a retrieval request that does not require currency and is a pass-through target. In response to this determination, the computer system performs the third retrieval request (451) on the back-end database (455). As a result, the computer system returns "OSAKA," as the value in the second row and the column with column item A3, to the source of the request (459), and ends the processing.

Figure 4G:
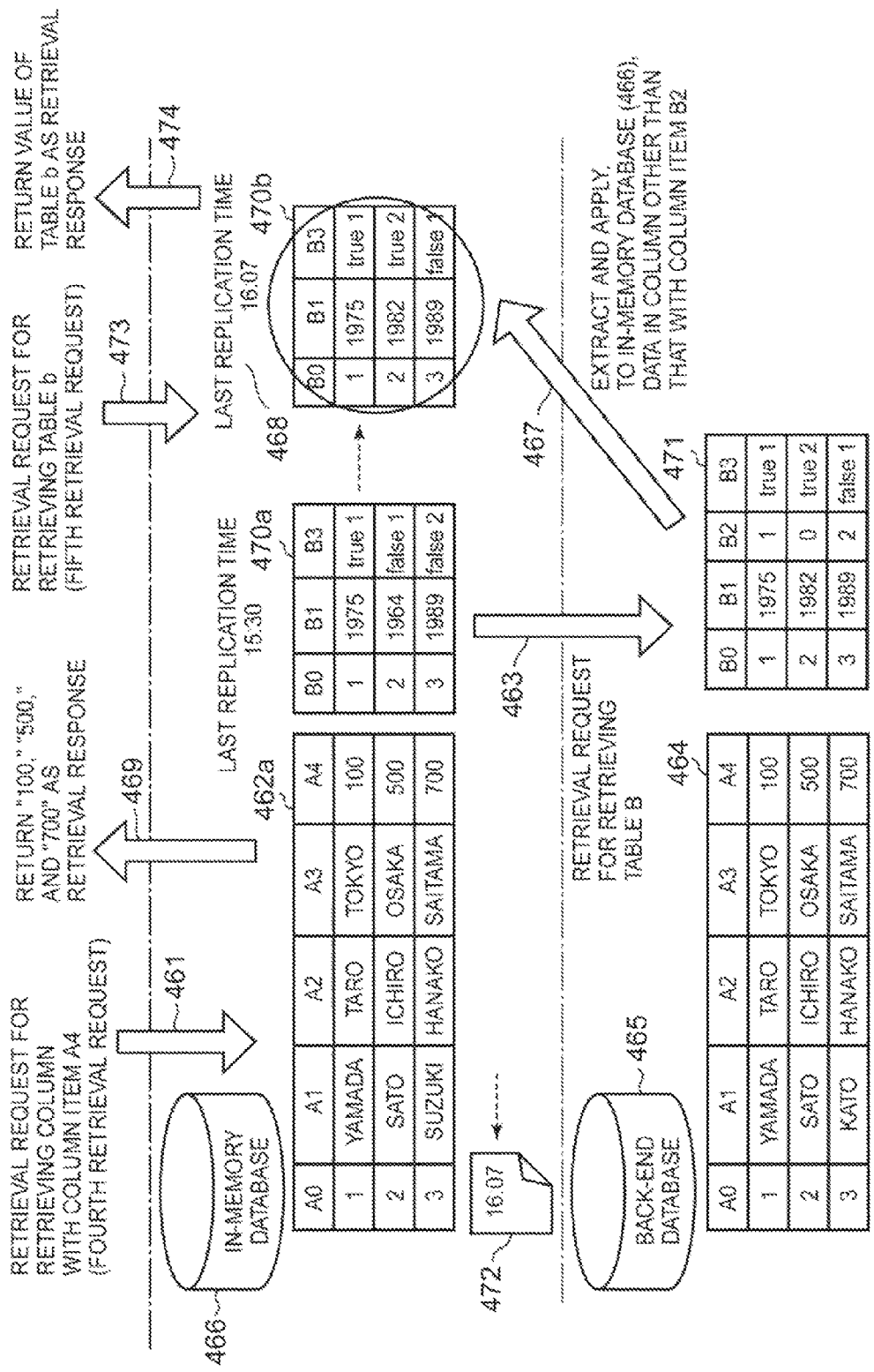
FIG. 4G shows an operation performed when a retrieval request for retrieving a column with column item A4 has been issued as an example when a future retrieval request with data currency required has been issued in the embodiment of the present invention.

FIG. 4G shows an operation performed when a retrieval request for retrieving a column with column item A4 (hereinafter referred to as "fourth retrieval request" (461)) has been issued as an example when a retrieval request that requires data currency for a future retrieval request has been issued in the embodiment of the present invention. Here, it is assumed that the current time is 16:00. When the fourth retrieval request (461) is issued, the computer system acquires the above information a4 from the list (412 in FIG. 4B). The fourth retrieval request (461) corresponds to the "retrieval request for retrieving a column with column item A4" described in the above a4 information. Therefore, the computer system calculates a check time for a "retrieval request for retrieving table b (hereinafter referred to as "fifth retrieval request")" as a retrieval request that can be issued after the fourth retrieval request (461). For example, the computer system can calculate the check time as 16:00 (current time)+10 minutes (expected issue time)−6 minutes (threshold value for the fifth retrieval request described in a3)/2=16:07. The computer system records the calculated check time in the list (472). In response to the recording, the computer system performs the fourth retrieval request (461) on the in-memory database (466). As a result, the computer system returns "100," "500," and "700" as values in the column with column item a4 to the source of the request (469).

When the current time reaches the check time 16:07, the computer system compares the time "15:30" of the last replication to the table b with the expected issue time "16:10 (16:00+10 minutes)" as the expected issue time of the fifth retrieval request in connection with data related to the fifth retrieval request. The elapsed time since the last replication is 16:10−15:30=40 minutes, and this exceeds the threshold value "6 minutes." Therefore, the computer system determines that data related to the fifth retrieval request needs synchronization. In response to this determination, the computer system creates a difference retrieval request (463) for extracting differential data between data related to the fifth retrieval request from the back-end database (465). The difference retrieval request (463) is the "retrieval request for retrieving table B," for example. In response to the creation of the difference retrieval request (463), the computer system performs the difference retrieval request (463) on the back-end database (465). As a result, for example, the computer system extracts data on columns other than that with column item B2, and applies them to the in-memory database (466). Further, the computer system records the time of application, i.e., "16:07," in a log or the like (468). In response to the recording, the computer system deletes the check time from the list (472)

When the fifth retrieval request was actually issued at the expected issue time, 16:10, of the fifth retrieval request (473), the computer system acquires the above information a3 from the list (411 in FIG. 4B). Since the fifth retrieval request corresponds to the "retrieval request for retrieving table b" described in the above a3 information, the computer system determines that the fifth retrieval request is a retrieval request that requires currency.

In response to the determination, the computer system compares the time of the last replication to the table b (470b), i.e., the time of application "16:07" with the current time "16:10" in connection with data related to the fifth retrieval request. The elapsed time since the application is 16:10−16:7=3 minutes, and this does not exceed the threshold value "6 minutes." Therefore, the computer system determines that data related to the fifth retrieval request does not need synchronization. In response to this determination that synchronization is unnecessary, the computer system performs the fifth retrieval request on the in-memory database (466). As a result, the computer system returns "1975," "1982," "1989," "true1," "true2," and "false1" as values of table b (470b) to the source of the request (474). After that, the computer system ends the processing.

Figure 5:
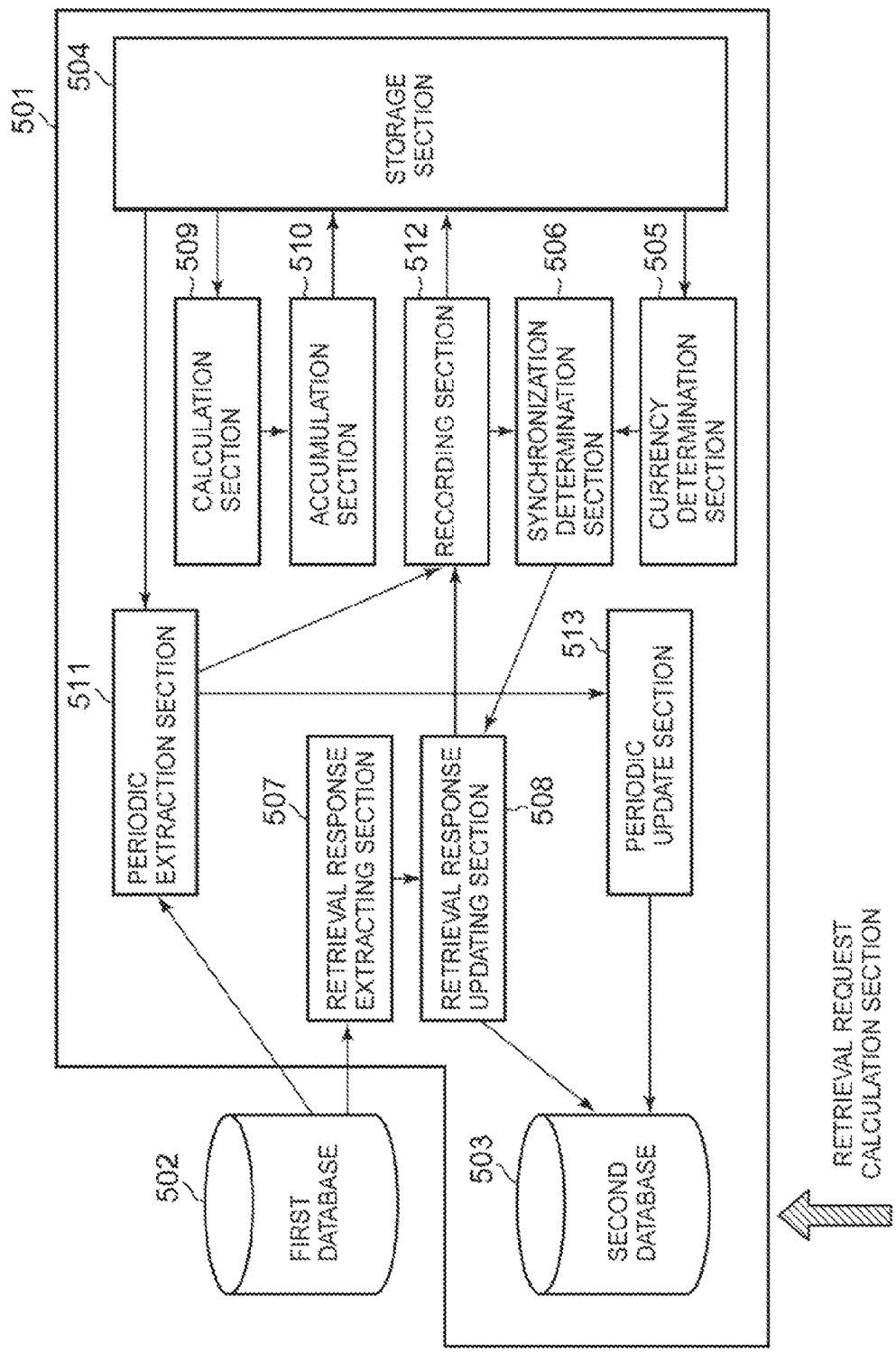
FIG. 5 is a functional block diagram showing the functions of the system configuration shown in FIG. 1B in the embodiment of the present invention.

FIG. 5 is a functional block diagram showing the functions of the system configuration shown in FIG. 1B in the embodiment of the present invention. The computer system (501) includes a second database (503), a storage section (504), a currency determination section (505), a synchronization determination section (506), a retrieval response extracting section (507), a retrieval response updating section (508), a calculation section (509), an accumulation section (510), a periodic extraction section (511), a recording section (512), and a periodic update section (513). The first database (502) may be a database on the computer system or another system. The first database (502) is a master database for data managed by the computer system (501). The managed data can be updated by the user, by any application on the computer system (501), or by any application on any other computer system. The second database (503) is at least one database holding at least one piece of data included in the first database (502), serving as a sub-database for the data managed by the computer system (501). The managed data can be retrieved by the user, by any application on the computer system (501), or by any application on any other computer system. For example, the user issues a retrieval request to the second database (503) to perform the retrieval. The storage section (504) is a storage area for storing a file managed by the computer system (501), for example. The file is a definition list, for example. The storage section (504) is a memory, for example.

In response to issuing the retrieval request to the second database (503), the currency determination section (505) determines whether the retrieval request (hereinafter referred to as "current retrieval request"), or a retrieval request (hereinafter referred to as "future retrieval request") likely to be issued after the current retrieval request, or both require data currency, respectively. The currency determination section (505) acquires the definition list from the storage section (504) to make the determination. If a declaration of the current retrieval request is defined in the definition list, the currency determination section (505) determines that the current retrieval request is a retrieval request that requires data currency. Further, If a declaration of the future retrieval request is defined in the definition list, the currency determination section (505) determines that the future retrieval request is a retrieval request that requires data currency.

The synchronization determination section (506) determines whether each retrieval request determined to require currency needs data synchronization. If the retrieval request determined to require currency is the current retrieval request, the synchronization determination section (506) makes the determination using threshold values for respective retrieval requests listed in the definition list acquired and the issue time of the current retrieval request. If the retrieval request determined to require currency is a future retrieval request, the synchronization determination section (506) makes the determination using a threshold value for the retrieval requests listed in the definition list acquired and the expected issue time of the retrieval request listed in the definition list acquired.

The retrieval response extracting section (507) extracts, from the first database (502), data on the retrieval request determined that data synchronization is necessary. The retrieval response extracting section (507) extracts, from the first database (502), differential data between a first data set in the first database (502) and a second data set as the target of the retrieval request in the second database (503). When the differential data is extracted, the recording section (512) stores the time of extraction in the storage section. The retrieval response updating section (508) applies, to the second database (503), the differential data extracted from the first database (502), and updates the second data set. The second database (503) returns, to the user, a response of the retrieval request when the second data set o is updated, when it is not determined that data currency is required, or when it is not determined that data synchronization is necessary.

The calculation section (509) calculates the time to begin to determine whether the future retrieval request requires data currency in response to issuing the current retrieval request. The calculation section (509) acquires the definition list from the storage section (504) to make the calculation. If a declaration of a future retrieval request corresponding to the current retrieval request is defined in the definition list, the calculation section (509) calculates the time to begin the determination on the future retrieval request using a threshold value for the retrieval request and the expected issue time listed in the definition list acquired. The accumulation section (510) accumulates the calculated time in storage section (504). The periodic extraction section (511) acquires the definition list and the calculated time from the storage section (504). The periodic extraction section (511) extracts the differential data from the first database (502) at a given time or at given time intervals defined in the definition list. Here, the differential data extracted is data on the future retrieval request after the lapse of the calculated time. The periodic extraction section (511) deletes, from the storage section (504), the time of calculation of the differential data extracted for the future retrieval request. When the differential data has been extracted, the recording section (512) stores the time of extraction in the storage section (504). The periodic update section (513) applies the extracted differential data to the second database (503) to update the second data set.

Figure 6:
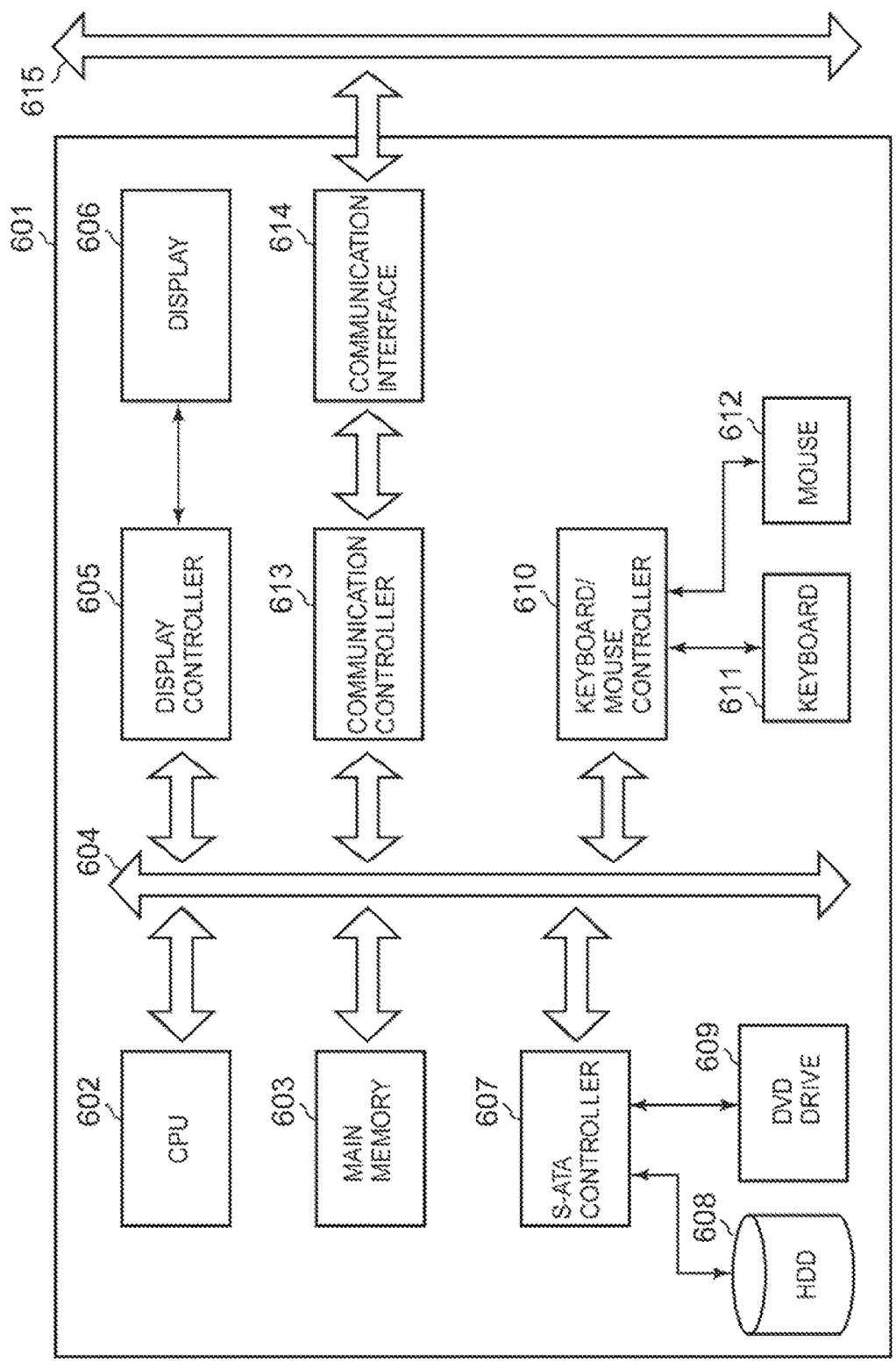
FIG. 6 is a block diagram of the hardware of the computer system shown in FIG. 5 in the embodiment of the present invention.

FIG. 6 is a block diagram of the hardware of the computer system shown in FIG. 5 in the embodiment of the present invention. A computer system (601) includes a CPU (602) and a main memory (603), and these components are connected to a bus (604). The CPU (602) is preferably based on a 32- or 64-bit architecture. For example, Xeon® series, Core™ series, Atom™ series, Pentium® series, or Celeron® series from Intel Corp., or Phenom™ series, Athlon™ series, Turion™ series, or Sempron™ from AMD corporation can be used. A display (606) such as an LCD monitor is connected to the bus (604) through a display controller (605). The display (606) is used to display, through a proper graphic user interface, information on the computer system connected to a network through a communication line and information on software currently running on the computer system in order to manage the computer system. Further, a hard disk or silicon disk drive (608), and a CD-ROM, DVD, or BD drive (609) are connected to the bus (604) through an IDE or SATA controller (607).

On the hard disk or silicon disk (608), an operating system, a program providing Java® processing environment such as J2EE, other programs and data are stored in such a manner to be loadable to the main memory (603).

The CD-ROM, DVD, or BD drive (609) is used to additionally introduce a program from the CD-ROM. DVD-ROM, or BD to the hard disk or silicon disk (608) as needed. Further, a keyboard (611) and a mouse (612) are connected to the bus (604) through a keyboard/mouse controller (610).

A communication interface (614) conforms to the Ethernet protocol, for example, and is connected to the bus (604) through a communication controller (613). The communication interface (614) takes a role in physically connecting the computer system and the communication line (615), and provide a network interface layer to the TCP/IP communication protocol of the communication function of the operating system of the computer system. The communication line may be in a wired LAN environment or a wireless LAN environment based on wireless LAN connection standards such as IEEE802. Ii a/b/g/n, for example.

What is claimed is:

1. A system for synchronizing data between a first-database and a second-database comprising:
 a memory; and
 a client configured for determining whether a retrieval request requires a synchronization of the second-database before processing the received retrieval request, wherein
 the system partially synchronizes the second-database from the first-database with only that portion of the first-database associated with the retrieval request in response to determining whether synchronization is required and for processing the retrieval request from the second-database, wherein
 the system, in response to issuing the retrieval request to the second-database, extracts from the first-database, differential data corresponding with the retrieval request between a first data set in the first-database and a second data set in the second-database as a retrieval target of the retrieval request, wherein the retrieval request includes a current retrieval request and a future retrieval request, wherein the future retrieval request is configured for issuance after the current retrieval request, and wherein the system, updates the second data set by applying only the differential data corresponding with the retrieval request to the second-database and by recording a time of updating the second data set, wherein the updated second data set is the retrieval target of the retrieval request, and wherein the differential data corresponding with the retrieval request represents only a portion of data out of all possible data sets that differ between the first-database and the second-database, and wherein the differential data indicates a difference between the second data set at a time of issue of a past retrieval request wherein the time of issue of the past retrieval issued before the retrieval request, and the second data set at the time of issue of the retrieval request.

2. The system of claim 1, further comprising:

an application for receiving the retrieval request from a user;

a driver for providing the application an application programming interface (API) for operating the databases;

an asynchronous replication transmitter for transmitting that portion of the first-database associated with the retrieval request;

an asynchronous replication receiver for receiving that portion of the first-database associated with the retrieval request; and an update log table for storing update information for the first-database, wherein the update information includes at least updated data and updated time.

3. The system of claim 1, wherein the client further comprises:

a structured query language (SQL) statement determiner for determining whether the retrieval request requires currency;

a second-database retrieval caller for processing the retrieval request from the second-database when the retrieval request does not require currency; and a first-database synchronization determiner coupled with a client-side synchronization time recorder for determining whether synchronization between the first-database and the second-database is required.

4. The system of claim 1, wherein the system further comprises:

a second-database synchronization determiner coupled with a system synchronizing time recorder for determining whether synchronization between the first-database and the second-database is required.

5. The system of claim 4, wherein the system further comprises:

an anticipated synchronization processor coupled with an anticipated synchronization request recorder and the system synchronizing time recorder for determining whether to request synchronization processing for each target table in the second-database associated with the retrieval request.

6. The system of claim 1, wherein the retrieval request includes at least one data set included in the database to be referenced and wherein the retrieval request further includes at least a SELECT phrase of an SQL statement, a pass-through request, or a command using a reserved word prepared for the databases.

7. The system of claim 3, wherein the client-side synchronization time recorder comprises a synchronization time concerting the target table.

8. The system of claim 4 wherein the system synchronizing time recorder comprises an update time of the target table.

9. The system of claim 3, wherein the client further comprises an SQL statement definition file, wherein the SQL statement definition file includes at least: a declaration of SQL statement that requires data currency, a table name, and a threshold value as a target of a synchronization processing performed according to the respective SQL statements.

10. The method according to claim 1, wherein the first-database is a back-end database and the second-database is an in-memory database.

11. A system for synchronizing data between a first-database and a second-database in response to a retrieval request comprising:

a memory;

an application for receiving the retrieval request from a user;

a driver for providing the application an application programming interface (API) for operating the databases;

a client configured for determining whether a retrieval request requires a synchronization of the second-database before processing the received retrieval request, wherein the system partially synchronizes the second-database from the first-database with only that portion of the first-database associated with the retrieval request in response to determining synchronization is required and for processing the retrieval request from the second-database, wherein that portion represents only a portion of data out of all possible data sets that differ between the first-database and the second-database, wherein the system, in response to issuing the retrieval request to the second-database, extracts from the first-database, differential data corresponding with the retrieval request between a first data set in the first-database and a second data set in the second-database as a retrieval target of the retrieval request, wherein the retrieval request includes a current retrieval request and a future retrieval request, wherein the future retrieval request is configured for issuance after the current retrieval request, and wherein the system, updates the second data set by applying only the differential data corresponding with the retrieval request to the second-database and by recording a time of updating the second data set, wherein the updated second data set is the retrieval target of the retrieval request, and wherein the differential data corresponding with the retrieval request represents only a portion of data out of all possible data sets that differ between the first-database and the second-database, and wherein the differential data indicates a difference between the second data set at a time of issue of a past retrieval request wherein the time of issue of the past retrieval issued before the retrieval request, and the second data set at the time of issue of the retrieval request;

an asynchronous replication transmitter for transmitting that portion of the first-database associated with the retrieval request;

an asynchronous replication receiver for receiving that portion of the first-database associated with the retrieval request; and an update log table for storing update information for the first-database, wherein the update information includes at least updated data and updated time.

12. The system of claim 11, wherein the client further comprises:

a structured query language (SQL) statement determiner for determining whether the retrieval request requires currency, wherein currency is determinative of whether the retrieval request requires up-to-date data;

a second-database retrieval caller for processing the retrieval request from the second-database when the retrieval request does not require currency; and a first-database synchronization determiner coupled with a client-side synchronization time recorder for determining whether synchronization between the first-database and the second-database is required.

13. The system of claim 11, wherein the system further comprises:

a second-database synchronizer coupled with a system synchronizing time recorder for determining whether synchronization between the first-database and the second-database is required.

14. The system of claim 13, wherein the system further comprises:

an anticipated synchronization processor coupled with an anticipated synchronization request recorder and the system synchronizing time recorder for determining whether to request synchronization processing for each target table in the second-database associated with the retrieval request.

15. The system of 12, wherein the retrieval request includes at least one data set included in the database to be referenced and wherein the retrieval request further includes at least a SELECT phrase of an SQL statement, a pass-through request, or a command using a reserved word prepared for the databases.

16. The system of claim 12, wherein the client-side synchronization time recorder comprises a synchronization time concerning the target table.

17. The system of claim 13 wherein the system synchronizing time recorder comprises an update time of the target table.

18. The system of claim 12, wherein the client further comprises an SQL statement definition file, wherein the SQL statement definition file includes at least: a declaration of SQL statements that require data currency, a table name, and a threshold value as a target of a synchronization processing performed according to the respective SQL statements.

19. The method according to claim 11, wherein the first-database is a back-end database and the second-database is an in-memory database.

* * * * *